United States Patent
Goel et al.

(10) Patent No.: US 10,354,227 B2
(45) Date of Patent: Jul. 16, 2019

(54) GENERATING DOCUMENT REVIEW WORKFLOWS

(71) Applicant: Adobe Inc., San Jose, CA (US)

(72) Inventors: Sourabh Goel, New Delhi (IN); Shilpi Aggarwal, New Delhi (IN)

(73) Assignee: ADOBE INC., San Jose, CA (US)

( * ) Notice: Subject to any disclaimer, the term of this patent is extended or adjusted under 35 U.S.C. 154(b) by 718 days.

(21) Appl. No.: 15/000,665

(22) Filed: Jan. 19, 2016

(65) Prior Publication Data
US 2017/0205965 A1  Jul. 20, 2017

(51) Int. Cl.
*G06F 9/00* (2006.01)
*G06Q 10/10* (2012.01)
*G06F 9/46* (2006.01)
*G06Q 30/02* (2012.01)

(52) U.S. Cl.
CPC ............. *G06Q 10/103* (2013.01); *G06F 9/46* (2013.01); *G06Q 30/02* (2013.01)

(58) Field of Classification Search
CPC ......... G06F 17/30713; G06F 17/30011; G06F 17/3053; G06F 9/46; G06F 3/0484; G06Q 30/02; G06Q 10/063; G06Q 50/18; G06Q 10/103
See application file for complete search history.

(56) References Cited

U.S. PATENT DOCUMENTS

| | | | | |
|---|---|---|---|---|
| 6,665,836 B1* | 12/2003 | Wynblatt | .......... | G06F 17/30908 707/999.001 |
| 8,407,078 B1* | 3/2013 | Caputo | .................. | G06Q 10/06 705/7.27 |
| 9,037,590 B2* | 5/2015 | Kumar | .............. | G06F 17/30713 707/737 |
| 2004/0181443 A1* | 9/2004 | Horton | .................. | G06Q 10/06 705/7.13 |
| 2004/0205454 A1* | 10/2004 | Gansky | ................ | G06F 16/951 715/230 |
| 2005/0171661 A1* | 8/2005 | Abdel-Malek | ...... | B61L 27/0094 701/31.4 |
| 2008/0059265 A1* | 3/2008 | Biazetti | ........... | G06Q 10/06311 705/7.19 |
| 2008/0183459 A1* | 7/2008 | Simonsen | ............. | G06F 17/289 704/1 |
| 2008/0270390 A1* | 10/2008 | Ward | .................. | G06F 17/3053 |
| 2009/0100041 A1* | 4/2009 | Wilson | .................. | G06F 21/645 |
| 2010/0077301 A1* | 3/2010 | Bodnick | ................ | G06Q 30/02 715/274 |
| 2010/0228693 A1* | 9/2010 | Dawson | ............. | G06F 17/2705 706/12 |
| 2011/0301982 A1* | 12/2011 | Green, Jr. | ............. | G06Q 10/06 705/3 |

(Continued)

*Primary Examiner* — Steven P Sax
(74) *Attorney, Agent, or Firm* — Keller Jolley Preece

(57) ABSTRACT

The present disclosure is directed toward systems and methods for managing electronic documents. For example, systems and methods described herein provide an electronic document owner with an analysis of one or more potential recipient's availability to review and sign the electronic document. Additionally, systems and methods described herein schedule the review and signing of an electronic document for a recipient such that the recipient does not miss the signing deadline for the electronic document.

20 Claims, 9 Drawing Sheets

(56) References Cited

U.S. PATENT DOCUMENTS

| | | | |
|---|---|---|---|
| 2013/0013996 A1* | 1/2013 | Wu | G06F 17/30011 715/227 |
| 2013/0055074 A1* | 2/2013 | Trese | G06F 17/2288 715/255 |
| 2014/0257910 A1* | 9/2014 | Anders | G06Q 10/06313 705/7.23 |
| 2014/0317049 A1* | 10/2014 | DeRoller | G06F 17/30011 707/608 |
| 2014/0372370 A1* | 12/2014 | Massand | G06F 17/30011 707/608 |
| 2015/0254791 A1* | 9/2015 | Stockton | G06Q 50/18 705/7.28 |
| 2016/0042460 A1* | 2/2016 | Hudak | G06Q 40/06 705/310 |
| 2017/0083492 A1* | 3/2017 | Chang | G06F 16/3344 |

* cited by examiner

Fig. 1B eSign services

Send  Manage

Get a Document Signed  John ▼

To: djackson@email.com
Show Cc  johndoe@email.com
janedoe@email.com
Enter or paste email addresses ☑ I need to sign  First | Last Document Name: LEASE Message: Please review and sign LEASE ☐ LEASE.pdf  Complexity: Medium
Upload complete.

☐ LEASE2.pdf  Complexity: High
Upload complete.

Drag more files here
Upload  OR select from: Document Library | Web Source  More Identity Verification ❓
Email delivery (default) ▼ 🗓

Due Date: February 12, 2016

Send Options
☐ Set password to open signed PDF ❓

Signer Availability - Doug Jackson

| 2/8 | 2/9 | 2/10 | 2/11 | 2/12 |
|---|---|---|---|---|
| 8a-12p meeting | 9a-10a call with Mike | 10a-2p sales strategy | 11a-12p call with Sandra | All Day personal- out of the office |
| 2p-4p review docs | 1p-4p meeting | 3p-5p HR meeting | 2p-4p team building | |

☑ Preview, position signatures or add form fields  Send

GENERATING DOCUMENT REVIEW WORKFLOWS

BACKGROUND

1. Technical Field

One or more embodiments described herein relate generally to managing electronic documents. More specifically, one or more embodiments relate to tracking and facilitating review and signing of electronic documents using an electronic signature system.

2. Background and Relevant Art

Due to increased interconnectivity, the use of electronic documents has become popular and commonplace. It is no longer problematic for two geographically diverse parties to enter into a signed agreement as both parties can now easily convert a document into an electronic format, and then send the converted electronic document over the Internet. For example, a business in one geographic region can enter into a contract with another business in another distant geographic region merely by electronically signing the contract, and emailing the contract to the other business. In this way, parties can enter into software contract agreements, licensing agreements, maintenance and support agreements, rental agreements, insurance policy agreements, and so forth without utilizing traditional paper copies of the various documents associated with these agreements.

Conventional electronic document systems allow a user to upload and distribute an electronic document to multiple recipients for their review and signature. However, depending on the length and complexity of the electronic document, a reviewer may be required to spend many hours reviewing the electronic document prior to approving or signing the electronic document. Thus, with conventional electronic document solutions, a problem exists when a document owner sends an electronic document to a reviewer who does not have enough time in his schedule to appropriately review and sign the electronic document prior to a deadline. In particular, in conventional electronic document systems, the document owner typically has no way of knowing that a reviewer's schedule does not allow adequate time for the reviewer to review the electronic document prior to the electronic document's deadline.

Additionally, with conventional electronic document systems, reviewer may not plan enough time to review an electronic document. For example, a reviewer may accept an invitation to review an electronic document without understanding the complexity of the electronic document. Due to the inability of conventional systems to provide a reviewer an indication of the complexity of an electronic document, the reviewer is generally unaware of how long the electronic document will take to review. Accordingly, the reviewer may not plan for enough time to properly review the electronic document before the deadline for the document expires.

The inability of a document owner to understand the scheduling constraints of one or more document reviewers, and the inability of a document reviewer to understand an amount of time a document will take to review, often causes review deadlines to be missed within conventional electronic document systems. In addition, even when deadlines are not missed, a reviewer often rushes a review of a document to meet a deadline, which leads to inaccurate and mistake prone reviews. As such, users of conventional electronic document systems become frustrated and feel overwhelmed by the inability to properly schedule the review of important electronic documents.

Thus, there are several disadvantages to current methods for managing electronic documents that require review and signature prior to a deadline.

SUMMARY

One or more embodiments described herein provide benefits and solve one or more of the foregoing or other problems in the art with systems and methods that provide an efficient and effective user experience for managing the review of electronic documents. For example, one or more embodiments include systems and methods that determine a complexity level of an electronic document. In particular, in one or more embodiments, the systems and methods described herein assign an estimated time that a reviewer would take to review the electronic document based on the determined complexity level of the electronic document. Thus, an electronic document owner and one or more recipients of the electronic document may easily discern how long a particular electronic document should take to review prior to signing.

Additionally, the systems and methods described herein determine whether a particular recipient has enough time in his schedule to review and sign an electronic document prior to a deadline corresponding to the electronic document. For example, in one or more embodiments, systems and methods described herein utilize the electronic document's determined complexity level and the estimated review time in combination with a recipient's schedule to determine whether the recipient has enough available time in his schedule to review and sign the electronic document prior to the deadline. If a recipient does not have adequate time in his schedule, the systems and methods described herein notify the document owner of the scheduling conflict. In addition, in one or more embodiments, the systems and methods can identify one or more alternate recipients who do have time in their schedules for review of the electronic document. The systems and methods can then propose the one or more alternate recipients to the document owner. Alternately, the systems and methods described herein can simply auto-delegate the electronic document to at least one of the one or more alternate recipients.

Furthermore, systems and methods described herein schedule the review of an electronic document into a recipient's existing calendar and provide the recipient with scheduling notifications. Thus, the recipient will know when he needs to begin review of the electronic document in order to sign the electronic document prior to its deadline. In at least one embodiment, if the recipient fails to begin review of the electronic document in enough time to sign the electronic document prior to its deadline, systems and methods described herein can auto-delegate the electronic document to an alternate recipient who still has enough time in his schedule for review and signing of the electronic document.

Systems and method described herein also determine a recommended order in which two or more recipients receive and review an electronic document. For example, if a document owner has specified two or more recipients to receive and review an electronic document, systems and methods described herein can determine that a first recipient will only be available to review the electronic document a few days before its deadline based on the first recipient's availability and the estimated review time for the electronic document. Accordingly, the systems and methods will determine that other recipients should review the electronic document before the first recipient receives and reviews the electronic document in order that all recipients are able to review the electronic document prior to the deadline.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 1A-1D illustrate a series of graphical user interfaces in connection with an electronic document management system that illustrate the upload of one or more electronic documents, the availability of one or more recipients, the scheduling of one or more recipients to review one or more electronic documents, and the notification of one or more recipients regarding an uploaded electronic document;

DETAILED DESCRIPTION

Figure 1A:
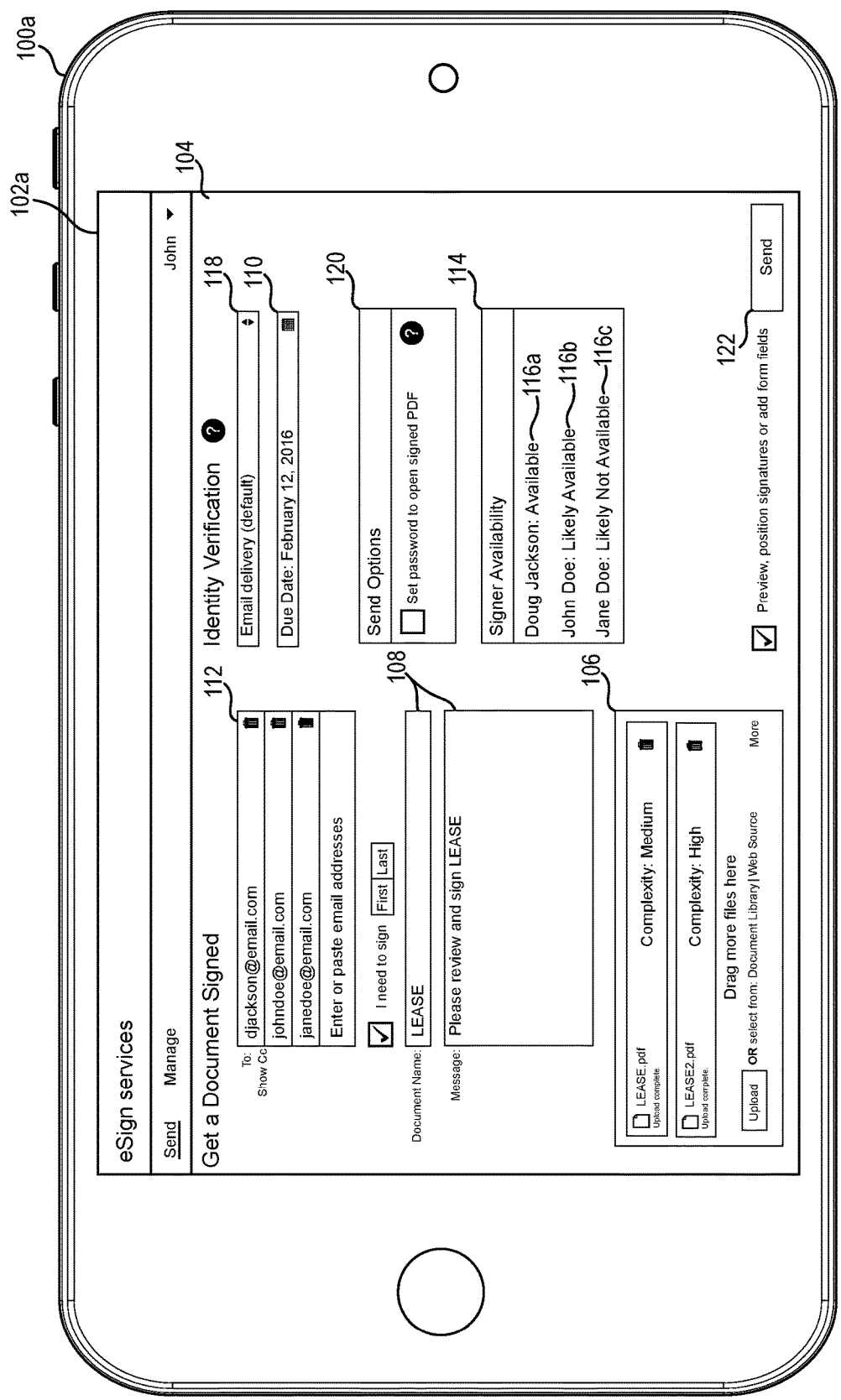

One or more embodiments described herein include an electronic document management system that organizes, analyzes, communicates, and otherwise manages the review of electronic documents. For example, the electronic document management system analyzes an electronic document to determine the electronic document's complexity. Using the determined complexity, the electronic document management system identifies an estimated time that a reviewer would take to review the electronic document. Based on the estimated time, the electronic document management system determines whether a particular recipient of the electronic document has sufficient time in his schedule to review and sign the electronic document prior to a deadline corresponding to the document. Along related lines, the electronic document management system also determines when to best schedule the review of the electronic document within a recipient's schedule such that the recipient will begin his review with adequate time to conduct a meaningful review.

To illustrate, an electronic document owner utilizes the electronic document management system to upload and send an electronic document to one or more recipients. Upon upload of the electronic document, the electronic document management system determines the complexity of the electronic document. In one or more embodiments, the electronic document management system determines the complexity of the electronic document by calculating the Flesch Reading Ease Index Score for the electronic document. Additionally, in one or more embodiments, the electronic document management system further enhances the complexity determination for the electronic document by taking into account the number of hyperlinks or the number of clauses within the electronic document. In one or more embodiments, the electronic document management system represents the complexity of an electronic document with a determined complexity score.

Once the electronic document management system has determined a complexity score for the electronic document, the electronic document management system determines an estimated review time for a recipient to review and sign the electronic document. For example, in at least one embodiment, the electronic document management system utilizes the determined complexity score for the electronic document to categorize the electronic document with other electronic documents with the same or similar complexity. In one or more embodiments, the electronic document management system uses previously recorded data to determine how long a reviewer takes to review an electronic document with a particular complexity score. Thus, the electronic document management system can estimate how long the electronic document should take to review by averaging how long other electronic documents with similar complexity scores took to review.

Once the electronic document management system determines an estimated review time for an electronic document, the electronic document management system determines how much time a specific recipient has available to review and sign the electronic document. For example, as part of the upload process, the electronic document owner can specify one or more potential recipients of the electronic document. For each potential recipient specified by the electronic document owner, the electronic document management system can access the potential recipient's schedule to determine how much available time the potential recipient has free before a deadline for the electronic document. If the potential recipient does not have sufficient time for review and signing of the electronic document, the electronic document management system can prompt the electronic document owner to select a different recipient. Additionally or alternatively, the electronic document manager system may auto-delegate the review and signing of the electronic document to another recipient with or without notifying the electronic document owner.

Additionally, once a recipient receives an electronic document for review and signing, the electronic document management system helps the recipient manage his time so that he can effectively review and sign the electronic document. For example, in one or more embodiments, the electronic document management system automatically schedules the review of the electronic document within the recipient's calendar at a time that gives the recipient sufficient time to review and sign the electronic document before the electronic document's signing deadline. Additionally, the electronic document review system monitors the recipient's review progress, or lack thereof, and sends the recipient reminders to begin to review the document, as well as notifications when it appears the recipient may not have enough time left before the document's deadline to complete the review. Additional details and examples of the electronic document management system will be discussed further below with respect to the Figures.

As used herein, the term "electronic document" refers to any collection of information that can be communicated between users of the various systems disclosed herein. An electronic document is generally in the form of a computer readable medium containing digital data. Electronic documents can be rendered in a variety of different ways, such as via display on a computer screen or monitor, by printing using an output device, or aurally using an audio player or text-to-speech software. Thus, it will be appreciated that electronic documents may include digital data in addition to or instead of text, for example, audio clips, video clips, photographs, and other multimedia assets. Documents may encompass a virtually unlimited range of subject matter, including documents that contain terms that are to be agreed to amongst various participants in a given workflow. Examples of such electronic documents include agreements, settlements, reports, articles, and legally binding contracts. For instance, both a word processing file containing the terms of a legally enforceable contract as well as a compressed audio file containing an audio recording of the same contract terms would both be considered "electronic documents" for the purposes of this disclosure. Such textual and audio components may be combined into a single "electronic document" in certain embodiments. Electronic documents may be communicated amongst users by a variety of techniques including wired or wireless transmission of digital data. In one or more embodiments, an electronic document can be formatted in various ways (e.g., "portable document format" or "PDF"). Typically, a user can read an electronic document by opening the electronic document within a software program associated with the format of the electronic document.

Also as used herein, an "electronic signature" generally refers to digital data that a user can attach or associate with an electronic document to indicate the user has signed the electronic document. For example, an electronic signature can include digital data in the form of a symbol adopted by a user. In one or more embodiments, an electronic signature reflects the fact that an electronic document is agreed to and legally executed. In at least one embodiment, an electronic signature can be embedded into an electronic document such that the electronic signature and the electronic document are no longer separable.

In one or more embodiments, the electronic document management system provides a series of graphical user interfaces ("GUIs" or "user interfaces") that enable a user to interact with the electronic document management system. The electronic document management system provides user interfaces on the display of a computing device, such as a touchscreen of a handheld device. As used herein, the term "handheld device" refers to a device sized and configured to be held in a single hand of a user (e.g., a mobile phone or smart phone, a personal digital assistant, a tablet computer, a smart wearable, etc.). Additionally, the electronic document management system can present a graphical user interface on any other suitable computing device such as, but not limited to, a larger wireless device, a laptop or desktop computer, or any other suitable computing device. Additional examples of computing devices are discussed below with reference to FIG. 5.

The process by which the electronic document management system determines the complexity of an electronic document and identifies whether potential recipients are capable of reviewing and signing the electronic document prior to a deadline will now be described with reference to a series of user interfaces shown in FIGS. 1A-1D. Generally, although FIGS. 1A-1D illustrate an embodiment in which the electronic document management system displays the series of user interfaces on the touch screen of a client-computing device such as a smart phone, tablet, smart wearable, etc., it is understood that the electronic document management system can provide the user interfaces illustrated in FIGS. 1A-1D on a standard display of a client-computing device such as a laptop or desktop computer. Furthermore, while the functionality of the electronic document management system described with reference to FIGS. 1A-1D is described in the context of a native application, in additional embodiments, the functionality of the electronic document management system can apply to network environments. For example, the electronic document management system can provide GUIs as part of a website for display in connection with a web browser.

As illustrated in FIG. 1A, the client-computing device 100a, includes a touch screen display 102a that can display user interfaces and by way of which user input may be received or detected. As used herein, a "touch screen display" refers to an input device that includes a display of a client-computing device that is capable of detecting user interactions that a user performs with respect to the display. For example, a user can interact with a client-computing device in the form of touch gestures made with respect to the touch screen display (e.g., tap gestures, swipe gestures, pinch gestures, reverse-pinch gestures, etc.). Additionally or alternatively, the client-computing device 100a may include any other suitable input device, such as a touch pad or those described below in reference to FIG. 5.

As described briefly above, an electronic document owner (e.g., the user of the client-computing device 100a) can begin the process of assigning one or more recipients to review and sign the electronic document via the electronic document management system by first uploading the electronic document to the electronic document management system. Accordingly, as illustrated in FIG. 1A, the electronic document management system provides the upload GUI 104 on the touch screen display 102a of the client-computing device 100a associated with the electronic document owner. In one or more embodiments, the upload GUI 104 includes various controls to assist an electronic document owner in uploading an electronic document and in providing extra information that the electronic document management system can associate with the electronic document (e.g., as metadata). In additional or alternative embodiments, the upload GUI 104 includes various controls to assist the electronic document owner in selecting an electronic document from an online repository, rather than uploading the electronic document from the client-computing device 100a.

The electronic document owner begins the process of uploading the electronic document by utilizing an upload control 106 to indicate an electronic document (i.e., "LEASE.pdf") to upload as well as the location within the storage of the client-computing device 100a, as shown in FIG. 1A. In one or more embodiments, the electronic document owner can simply drag-and-drop a file from a file browser of the client-computing device 100a to the upload control 106. In additional or alternative embodiments, the upload control 106 includes a file selection dialog box in order for the electronic document owner to select an electronic document for uploading.

At this point, when the electronic document "LEASE.pdf" is first uploaded to the electronic document management system, the electronic document management system determines a complexity of the electronic document. As mentioned above, the electronic document management system analyzes one or more of several aspects of an electronic document in order to determine a complexity to associate with the electronic document. For example, in one or more embodiments, the electronic document management system calculates a Flesch Reading Ease Score associated with the electronic document. In one or more embodiments, an electronic document's Flesch Reading Ease Score measures textual difficulty that indicates how easy or difficult a document is for an average reader to read. In order to calculate the electronic document's Flesch Reading Ease Score, the electronic document management system identifies one or more document characteristics. For example, document characteristics can include the following: the total number of words in the electronic document, the total number of sentences in the electronic document, and the total number of syllables in the electronic document. The electronic document management system can identify words, sentences, and syllables within the electronic document using standard parsing rules and techniques.

Using the identified document characteristics, the electronic document management system calculates the Flesch Reading Ease Score ("FRES") for the electronic document, using the following equation:

$$FRES=206.835-1.015(\text{total words/total sentences})-84.6(\text{total syllables/total words})$$

Generally, the result of the above equation provides a score between 0 and 100, depending on the document characteristics of a particular electronic document. According to where the Flesch Reading Ease Score falls within this range, the electronic document management system can determine the complexity of a particular electronic document (e.g., how easy or how difficult the electronic document is to read). For example, a Flesch Reading Ease Score of 100 is considered very easy to read. Documents with this score generally have average sentence lengths of 12 words or fewer, with no words of more than two syllables. A Flesch Reading Ease Score of 65 is considered plain English with average sentences of 15 to 20 words, and the average word having two syllables. A Flesch Reading Ease Score of 30 is considered a difficult to read with sentences of mostly 25 words in length, where each word is generally two syllables. Finally, a Flesch Reading Ease Score of 0 is considered very hard to read with an average sentence length of 37 words, where each word on average has more than two syllables.

Although one or more embodiments described herein utilize the Flesch Reading Ease Score in determining the complexity of an electronic document, other embodiments may utilize other readability tests that rely on additional or fewer document characteristics. For example, in one alternative embodiment, the electronic document management system can utilize the Flesch-Kincaid Grade Level formula to determine the level of reading difficulty associated with an electronic document. Other types of readability tests that may be employed by the electronic document management system include, but are not limited to, the Automated Readability Index, the Gunning Fog Index, the SMOG Index, the Fry Readability Formula, or the Coleman-Liau Index.

In addition to calculating the Flesch Reading Ease Score (or other readability metric), the electronic document management system can take into account additional characteristics of the electronic document in determining the complexity of the electronic document. For example, in one or more embodiments, the electronic document management system identifies the number of hyperlinks within the electronic document. The electronic document management system identifies a hyperlink by using various format rules (e.g., a hyperlink generally begins with "http://" or "www," and ends with a ".com," ".net," ".edu," etc.), or by identifying metadata associated with the electronic document. In one or more embodiments, the electronic document management system assumes that a hyperlink in an electronic document increases the time it would take a recipient to review the electronic document as the recipient would likely take additional time to click on the hyperlink and review the information to which the hyperlink points.

Furthermore, the electronic document management system also identifies the number of clauses within the electronic document. As used herein, a "clause" within an electronic document refers to a portion of the electronic document that is associated with a subheading, title, or section number within the electronic document. In at least one embodiment, the electronic document management system utilizes general parsing and format rules to identify a clause within an electronic document. Generally, as the number of clauses within an electronic document increases, the complexity of the document also increases (e.g., legal documents typically are organized in clauses and are considered to require a longer review time for an average recipient).

In at least one embodiment, the electronic document management system takes the Flesch Reading Ease Score, the number of hyperlinks, and the number of clauses in the electronic document into account in determining an overall complexity of the electronic document. For example, the electronic document management system can determine the overall complexity of the electronic document (DC) with the following equation:

$$DC=x*F+y*L+z*C$$

where F=Flesch Reading Ease Score
  L=total number of hyperlinks
  Z=total number of clauses The parameters x, y, and z are weights that are predefined by the electronic document management system. In one or more embodiments, the electronic document management system tunes the weights in the overall complexity calculation based on historic data and user test data over time (e.g., such as in a machine learning model). Alternatively, the weights in the overall complexity calculation may be static.

Although the overall complexity calculation is described above with reference to a single electronic document, the overall complexity calculation can easily be scaled to apply to multiple electronic documents. For example, if the document owner uploads multiple electronic documents, the electronic document management system can repeat the complexity calculation for each uploaded document. Alternatively, if the document owner indicates that multiple uploaded electronic documents should be reviewed together as a batch, the electronic document can treat the multiple uploaded electronic documents as a single document for complexity calculation purposes. In that case, the electronic document management system can calculate a single overall complexity score for the multiple uploaded electronic documents.

Based on determining the overall complexity score of an electronic document, the electronic document management system categorizes or "bucketizes" the electronic document based on the document's overall complexity score (DC), as shown in the following table:

TABLE 1

| Complexity Bucket (Category) | DC (complexity of document) Score Range |
|---|---|
| Complexity A | 0-5 |
| Complexity B | 6-15 |
| Complexity C | 16-30 |
| Complexity D | 31-60 |
| Complexity E | 61-100 |

Once the electronic document management system determines which complexity bucket or category the electronic document falls into, the electronic document management system can identify an estimated review time for the electronic document.

The electronic document management system determines how long a document falling into any of the complexity buckets or categories should take a recipient to review by collecting and analyzing user data over time from other users of the electronic document management system. For example, the electronic document management system monitors how long a user takes to review an electronic document in the Complexity A category. For instance, the electronic document management system can monitor that the electronic document is open for reading, and that the user is actively reading the electronic document while it is open (e.g., via eye tracking, scroll tracking, mouse or keyboard tracking, etc.). This information is then stored in a repository of user data.

Over time, the electronic document management system averages the review times associated with each complexity category to find an overall average review time for each category. In alternative embodiments, the electronic document management system can find the mean of review times for each category. The electronic document management system can further tune the average review times for each complexity category past the learning period by continuing to monitor review times of users of the electronic document management system. Accordingly, once the electronic document management system determines a complexity category for an uploaded electronic document, the electronic document management system can then assign an estimated review time to the electronic document based on the average review times for all electronic documents in that complexity category.

Alternatively, rather than determining an average review time for electronic documents in each of the complexity categories, as described above, the electronic document management system can determine an expected review time for a particular user who is reviewing an electronic document of a particular complexity. For example, during a learning period, the electronic document management system can utilize the average category values described above while collecting review data for the particular user (e.g., the amount of time the particular user spends in reviewing electronic documents of varying complexity levels). Once, the electronic document management system builds a sufficient repository of information for the particular user based on actual observed review times for the particular user, the electronic document management system can assign a more accurate estimated review time to a new electronic document that is customized to the particular user.

With reference again to FIG. 1A, the electronic document management system can provide a complexity indicator upon upload of each electronic document via the upload GUI 104. For example, as shown in the upload control 106, the electronic document management system includes an indicator (e.g., "Complexity: Medium," "Complexity: High") associated with each uploaded document. In additional or alternative embodiments, the electronic document management system can include colors, highlights, fonts, text sizes, etc. in order to indicate the determined complexity level of a particular uploaded document.

Also as illustrated in FIG. 1A, the electronic document management system provides an upload data control 108 as part of the upload GUI 104. Utilizing the upload data control 108, the electronic document owner can provide additional data in association with a particular electronic document that the owner has uploaded. For example, the document owner can specify the electronic document's title, recipient instructions, and so forth via the upload data control 108. In one or more embodiments, the electronic document management system stores the information provided via the upload data control 108 as metadata associated with an uploaded electronic document.

Additionally, as shown in FIG. 1A, the electronic document management system provides a document deadline control 110 as part of the upload GUI 104. As described above, electronic documents that require review and signature by one or more recipients are generally associated with a deadline by which the electronic document must by signed. In one embodiment, the electronic document owner may simply specify the electronic document's deadline by entering a date into the document deadline control 110. In additional or alternative embodiments, the electronic document management system can extract a deadline associated with the electronic document by analyzing the electronic document to identify a deadline. For example, in the event the electronic document is a contract, the electronic document management system can identify an execution date as the deadline and automatically fill in the document deadline control 110.

Furthermore, in at least one embodiment, the electronic document owner may specify different deadlines associated with different recipients via the document deadline control 110. For example, the document owner may wish for two or more recipients of an electronic document to review and sign the electronic document in a particular order. Accordingly, the document owner can specify an earlier signing deadline for one recipient, and a later signing deadline for another recipient. In order to specify varying signing deadlines, the document owner can select a recipient from a recipient control 112, as shown in FIG. 1A, and an uploaded electronic document from the upload control 106, and then specify a deadline via the document deadline control 110.

As briefly referred to above, the electronic document owner can specify one or more recipients of the one or more uploaded electronic documents via a recipient control 112. As shown in FIG. 1A, the electronic document management system allows the document owner to specify one or more recipients by listing a unique identifier for each potential recipient using the recipient control 112. In one or more embodiments, the document owner utilizes the recipient control 112 to specify one or more recipients by their email addresses. In other embodiments, the document owner can utilize the recipient control 112 to specify recipients according to screen names, user IDs, or by any other unique identifier. In addition, in one or more embodiments, the recipient control 112 can access the owner's address book or other contact list to allow the owner to search for and select a particular recipient.

Once the owner of an electronic document has selected the electronic document, identified one or more recipients, and assigned a deadline, the electronic document management system determines whether the one or more identified recipients are available to review and sign an uploaded electronic document prior to the document's deadline. In one or more embodiments, the analysis of determining the availability of the one or more identified recipients can begin prior to the user choosing to send the electronic document (e.g., by interacting with the send button 122, shown in FIG. 1A). Alternatively, the electronic document management system can analyze the document and recipient's schedules prior to the owner interacting with the send button 122. Regardless of when the actual analysis is performed within the electronic document management system, the electronic document management system may determine that an identified recipient is not available, and in response, can notify the electronic document owner to provide the owner with alternative options (e.g., suggesting a new deadline or suggesting one or more available recipients).

Accordingly, in response to the document owner specifying a recipient of an uploaded electronic document via the recipient control 112, as shown in FIG. 1A, the electronic document management system can perform an analysis to determine whether the specified recipient is available. For instance, the electronic document management system calculates the amount of available time the potential recipient has prior to the specified deadline for the electronic document. In at least one embodiment, the electronic document management system accesses information regarding all the electronic documents that have already been assigned to the specified recipient for the recipient's review and signature, along with the determined complexity scores, estimated review times, and deadlines for those previously assigned electronic documents. Furthermore, the electronic document management system also can access information that indicates on how long the potential recipient takes to review documents within varying complexity categories. Accordingly, based on the specified recipient's history and existing workload within the electronic document management system, the electronic document management system can estimate how much available time the potential recipient has prior to the uploaded electronic document's deadline.

To illustrate, suppose a recipient is capable of spending 8 hours a day reviewing and signing electronic documents. In this example, the electronic document management system has already determined that the potential recipient averages 40 hours to review a document in complexity category A, 31 hours to review a document in complexity category B, 25 hours to review a document in complexity category C, 19 hours to review a document in complexity category D, and 10 hours to review a document in complexity category E. Also suppose that the recipient has already been assigned an electronic document in complexity category A, and another electronic document in complexity category B. If both electronic documents have deadlines in the next 10 days, the recipient will need to spend 71 hours in the next 10 days (e.g., approximately 9 days at 8 hours a day) to review and sign the previously assigned electronic documents. As such, the recipient only has approximately one day available to review and sign any other electronic document in the next 10 days. Accordingly, if a document owner attempts to assign an electronic document to the potential recipient with a deadline in the next 10 days that has a complexity category higher than complexity category E, the electronic document management system will notify the document owner that the potential recipient will likely not be able to meet the deadline.

In additional embodiments, the electronic document management system includes one or more application programming interfaces ("APIs"), or other communication protocols that allow the electronic document management system to interface with one or more calendaring applications of one or more potential recipients. For example, in response to the document owner specifying a recipient via the recipient control 112, the electronic document management system can access the recipient's personal calendar, business calendar, etc. to better estimate the potential recipient's availability. Accordingly, in that case, the electronic document management system can take into account not only the potential recipient's existing obligations with regard to reviewing and signing electronic documents, but also the potential recipient's additional appointments, meetings, vacations, and so forth.

In response to the document owner specifying a recipient via the recipient control 112, as shown in FIG. 1A, the electronic document management system determines the recipient's available time to review and sign the uploaded electronic document prior to the document's deadline, as described above. Once the electronic document management system has determined the recipient's time availability, the electronic document management system provides the recipient availability control 114 including one or more individual recipient controls 116a-116c. In one or more embodiments, each individual recipient control 116a, 116b, 116c corresponds to a potential recipient specified via the recipient control 112.

In one or more embodiments, the electronic document management system provides additional information about the availability of a potential recipient via the recipient availability control 114. For example, in response to the document owner selecting the individual recipient control 116a within the recipient availability control 114, as shown in FIG. 1A, the electronic document management system provides a recipient schedule review 124, as shown in FIG. 1B. In one or more embodiments, the recipient schedule review 124 illustrates the availability of the recipient associated with the individual recipient control 116a. In at least one embodiment, the recipient schedule review 124 illustrates the associated recipient's availability during a time period starting at the current time and ending at the deadline of the uploaded electronic document as shown in the document deadline control 110. Although the recipient schedule review 124 is illustrated as an overlay on the recipient availability control 114 in FIG. 1B, in other embodiments, the electronic document management system can provide the potential recipient schedule review 124 as a popup window or other type of GUI. In at least one embodiment, the document owner can toggle back to the list of individual recipient controls 116a-116c from the potential recipient schedule review 124 by tapping on the recipient availability control 114.

In one or more embodiments, in response to the electronic document management system determining that a potential recipient is likely not available to review and sign an uploaded electronic document prior to the document's deadline (e.g., as with "Jane Doe" shown in FIG. 1A), the electronic document management system can provide alternative recipient suggestions. For example, in one embodiment, the electronic document management system accesses organizational information associated with a business in order to identify one or more alternative potential recipients.

To illustrate, a business may utilize the electronic document management system to manage electronic documents for the business. Accordingly, multiple employees of the business may have accounts within the electronic document management system where each employee account indicates the employee's organizational position within the business. In some embodiments, employees at the same or higher organizational level may be substituted for each other in reviewing and signing an electronic document. As such, the electronic document management system identifies and suggests one or more additional users who are employed by the same business at the same or higher organizational level as the potential recipient who is likely unavailable. Additionally, the electronic document management system can perform the same availability analysis as described above to determine whether an alternate recipient is likely available to review and sign the electronic document prior to suggesting the alternate recipient to the document owner. The electronic document management system can provide the suggested alternate recipients via a popup window (not shown) for the document owner's selection.

In one or more embodiments, the electronic document management system can provide various options to the document owner in response to determining that a recipient will likely not be able to review and sign an electronic document. For example, the electronic document management system can change the recipient to one or more of the suggested alternate recipients, as described above. Alternatively, the electronic document management may suggest an alternate signing order for two or more recipients. As described above, the document owner can specify a signing order and various deadlines for two or more recipients. The electronic document management system may determine that a recipient who likely cannot complete review of an electronic document in a first assigned order may be able to complete review of the electronic document if the order of recipients is changed. In that case, the electronic document management system may suggest an alternate signing order to the document owner. Finally, the document owner can simply send the electronic document to the specified recipients, regardless of any availability determination by the electronic document management system.

Referring to both FIGS. 1A and 1B, the electronic document management system provides addition controls in the upload GUI 104. For example, the electronic document owner can further specify additional instructions and information associated with one or more uploaded electronic documents via the identity verification control 118 and the additional options control 120. In at least one embodiment, the document owner can indicate via the identity verification control 118 how one or more recipients of the electronic document can verify his or her identity (e.g., via e-mail delivery, with a password, with a security question, etc.). Additionally, the document owner can specify various additional options (e.g., a password lock, delivery confirmation emails, encryption settings) via the additional options control 120.

Figure 1C:
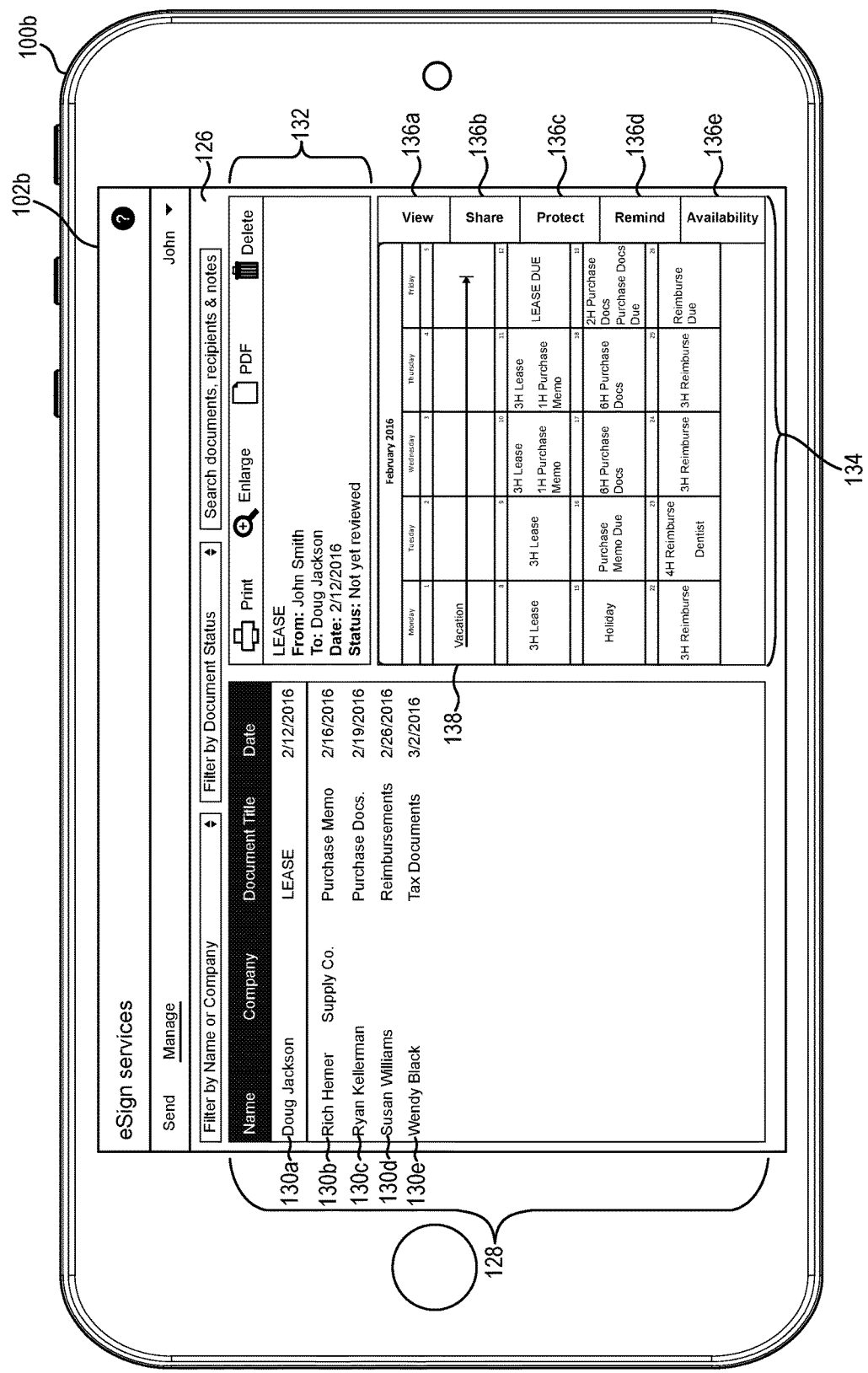

In response to the document owner entering in the information illustrated in the upload GUI 104 and tapping or clicking the send button 122, as shown in FIG. 1A or 1B, the electronic document management system provides the one or more uploaded electronic documents to the one or more recipients specified via the recipient control 112. In order to access, review, and sign electronic documents, the electronic document management system provides a document review GUI 126 on a touch screen display 102b of the recipient's client-computing device 100b, as shown in FIG. 1C. In one or more embodiments, the document review GUI 126 is a management interface with a variety of controls by way of which the electronic document recipient can access not only the electronic document, but also additional information associated with the electronic document. For example, as shown in FIG. 1C, the document review GUI 126 includes a stored document list 128 listing stored document controls 130a, 130b, 130c, 130d, and 130e. In at least one embodiment, each of the stored documents controls 130a-130e are representative of an electronic document that has been provided to the user of the client-computing device 100b (e.g., the electronic document recipient) and managed by the electronic document management system.

In response to the user of the client-computing device 100b clicking or tapping one of the stored document controls 130a-130e, the electronic document management system updates the document review GUI 126 with information associated with the selected stored document control. For example, as shown in FIG. 1C, in response to the user selecting the stored document control 130a (i.e., representative of the electronic document "LEASE"), the electronic document management system updates the overview control 132 and the options control box 134 with information specific to the electronic document associated with the stored document control 130a.

In one or more embodiments, the overview control 132 includes identification information for the electronic document associated with the stored document control 130a. As shown in FIG. 1C, this information can include the name of the electronic document (i.e., "LEASE"), the parties related to the electronic document (i.e., "John Smith," "Doug Jackson," "John Doe," "Jane Doe"), the deadline associated with the electronic document (i.e., "2/12/16"), and the status of the electronic document with regard to the user of the client-computing device 100b (i.e., "Not yet reviewed"). In at least one embodiment, the overview control 132 includes interactive elements that allow the user of the client-computing device 100b to print, enlarge, view, or delete the electronic document associated with the stored document control 130a.

In one or more embodiments, the options control box 134 includes information related to the electronic document associated with the stored document control 130a, and organized according to the options tabs 136a, 136b, 136c, 136d, and 136e. For example, by selecting the options tab 136a (i.e., "View"), the electronic document management system provides, within the options control box 134, a minimized view of the electronic document associated with the stored document control 130a. Furthermore, by selecting the options tab 136b (i.e., "Share"), the electronic document management system provides additional controls by which the user can email, text, upload, etc. the electronic document associated with the stored document control 130a. By selecting the options tab 136c (i.e., "Protect"), the electronic document management system provides additional controls by which the user can add encryption or password protection to the electronic document associated with the stored document control 130a.

In response to the user selecting the options tab 136d (i.e., "Remind"), the electronic document management system provides additional controls by which the user can configure a reminder related to the electronic document associated with the stored document control 130a. For example, by utilizing additional controls associated with the options tab 136*d*, the user can specify the contents, date, frequency, and recipients of a reminder or alert related to the electronic document associated with the stored document control 130*a*. In additional or alternative embodiments, the electronic document management system also automatically provides notifications without any need of configuration from the user, as will be described in more detail below.

Finally, by selecting the options tab 136*e* (i.e., "Availability"), the electronic document management system provides a calendar view 138 within the options control box 134, as shown in FIG. 1C. As mentioned above, the electronic document management system can schedule the review and signing of electronic documents provided to a recipient such that the recipient can complete the review and signing of the electronic documents prior to their respective deadlines. In one or more embodiments, the electronic document management system provides a suggested review and signing schedule within the calendar view 138. In at least one embodiment, the electronic document management system provides the suggested schedule in accordance with one or more preferences of the recipient. For example, the recipient may specify preferences such as, but not limited to, only review electronic documents on weekdays, only spend a maximum of five hours a day reviewing electronic documents, do not review any additional electronic documents on a day when a particular electronic document has a deadline, and so forth.

In one or more embodiments, the electronic document management system dynamically updates the calendar view 138 based on changing data. For example, as mentioned above, the electronic document management system tracks user behavior in association with a particular electronic document (e.g., how long the user has the electronic document open within the electronic document management system, eye tracking, scroll tracking, etc.). Thus, the electronic document management system can estimate how much progress a user is making in reviewing a particular electronic document and determine whether the user is falling behind the schedule suggested by the electronic document management system via the calendar view 138.

If it appears the user is falling behind or not meeting the suggested schedule, the electronic document management system can update the suggested schedule provided via the calendar view 138. Updating the suggested schedule may mean overriding various user preferences as described above. For example, in order to meet a particular electronic document's signing deadline, the electronic document management system may update the suggested schedule to include review of the particular electronic document on a day including another electronic document's signing deadline, even though the recipient has specified a preference to the contrary. In another example, in order to meet a particular electronic document's signing deadline, the electronic document management system may update the suggested schedule to include more than five hours of document review on a particular day, even though the recipient has specified a preference to the contrary.

As mentioned above, the electronic document management system provides notifications to various electronic document management system users under various circumstances. In one or more embodiments, in response to determining that an electronic document recipient is coming close to missing a signing deadline associated with an electronic document, the electronic document management system generates and sends a notification to the recipient. For example, as shown in FIG. 1D, in response to determining that a recipient (i.e., "Doug Jackson") has fallen behind in reviewing an electronic document (i.e., "LEASE") and that he likely will not meet the document's signing deadline, the electronic document management system generates the notification 142 and provides the notification 142 via the notification GUI 140 on the touch screen display 102*b* of the recipient's client-computing device 100*b*.

In one or more embodiments, the electronic document management system generates the notification 142 as an email, and provides the notification 142 to the recipient via one or more email accounts specified by the recipient. In additional or alternative embodiments, the electronic document management system can generate and provide the notification 142 as a text message (e.g., SMS), a page, an automated text-to-talk phone call, a software application pop-up message, and so forth. In at least one embodiment, the recipient can configure the type of notification the electronic document management system provides as part of his account settings or user preferences.

Figure 1D:
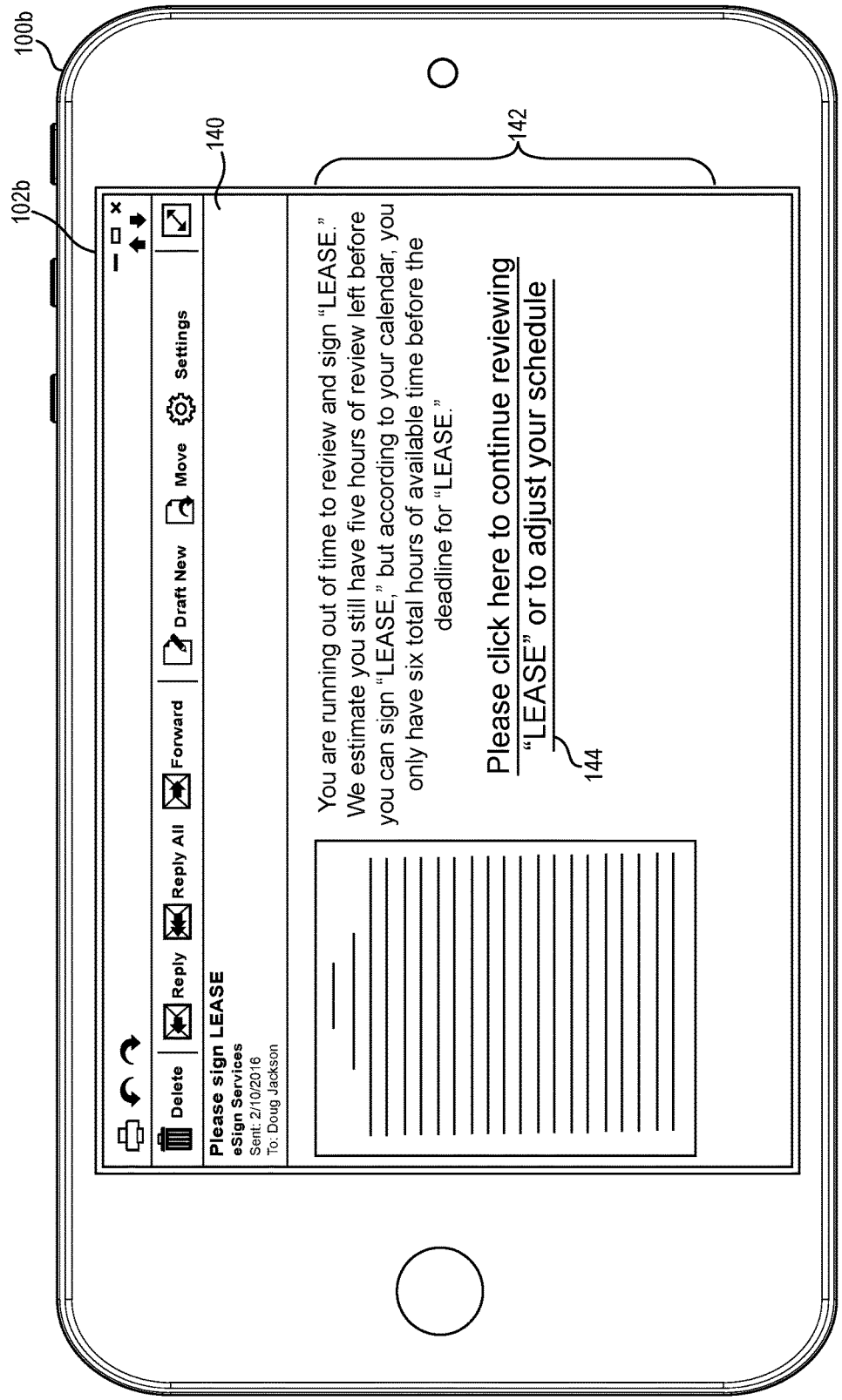

As shown in FIG. 1D, the notification 142 includes a message warning the recipient that the signing deadline for the electronic document is fast approaching. Additionally, the electronic document management system can include additional information in the notification 142 such as an estimated amount of time the recipient will have to spend before completing review of the electronic document (i.e., "5 hours"), and how much available time the recipient has before the signing deadline for the electronic document elapses (i.e., "6 total hours"). Furthermore, the electronic document management system can provide a hyperlink 144 to the electronic document. In response to the recipient clicking or tapping on the hyperlink 144, the electronic document management system can open a reviewing window within the electronic document management system and direct the recipient to the last portion of the electronic document reviewed by the recipient. In at least one embodiment, the notification 142 also includes an option for the recipient to select an alternate to delegate the review and signing of the electronic document. If the recipient decides to delegate the review and signing of the electronic document, the electronic document management system may generate a notification for the electronic document owner to that effect.

Additionally, the electronic document management system also generates and provides notifications to the document owner. For example, in response to determining that one or more recipients of an electronic document are falling behind in review of the electronic document or are likely not going to be able to meet the signing deadline for the electronic document, the electronic document management system can generate and provide a notification to the electronic document owner to that effect. In one or more embodiments, the electronic document management system can provide the document owner, via a generated notification, a mechanism to write an email to one or more recipients, initiate a phone call with one or more recipients, etc.

In at least one embodiment, in response to determining that a particular recipient will likely not complete review and signing of an electronic document prior to the document's deadline, the electronic document management system identifies one or more alternate recipients to suggest to the document owner. For example, as described above, the electronic document management system accesses organizational information to identify suitable and available alternate recipients for suggestion to the document owner. Alternatively, the document owner may have previously specified auto-delegation rules that detail one or more alternate recipients for the electronic document management system to provide the electronic document to in the event that one or more recipients fail to review and sign the electronic document in time. In that case, the electronic document management system may provide the electronic document to the one or more specified alternates without any notification to the document owner.

Therefore, and based on the above detail, the electronic document management system performs real-time monitoring of electronic document recipients review progress and availability on an ongoing basis until the electronic document has been reviewed and signed by all necessary parties. In this way, the electronic document management system can continually update review schedules, delegate review and signing of an electronic document, and provide notifications to relevant parties. For example, a particular recipient may be performing an electronic document review on schedule until an unexpected meeting is added to the recipient's calendar. The electronic document management system can determine, in real time, that the unexpected meeting will derail the recipient's ability to complete review of the electronic document prior to the document's deadline. Accordingly, the electronic document management system can delegate review and signing of the electronic document to another recipient to ensure that the electronic document is properly reviewed and signed in time. Additionally, in that case, the electronic document management system will also provide notifications to the document owner, the derailed recipient, and the new recipient of the delegation.

Figure 2:
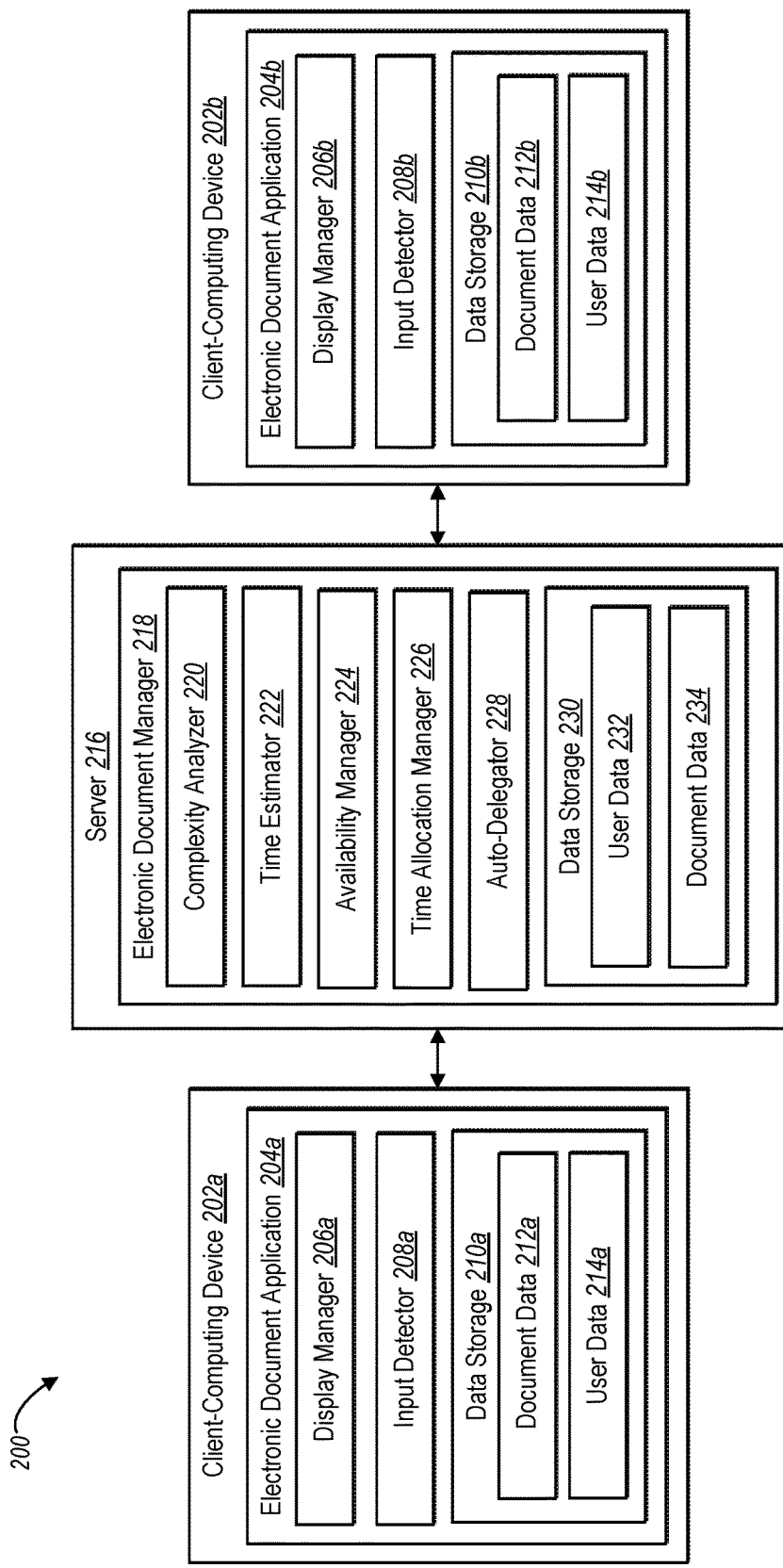
FIG. 2 illustrates a schematic diagram of the electronic document management system of FIG. 1 in accordance with one or more embodiments.

FIGS. 1A-1D and their related descriptions detail the functions and features of the electronic document management system with regard to a series of user interfaces with which a user can interact. FIG. 2 illustrates an example architecture for the electronic document management system 200. For example, as shown in FIG. 2, the electronic document management system 200 includes an electronic document manager 218 installed on a server 216 and communicatively coupled to an electronic document application 204a, 204b installed on the client-computing devices 202a, 202b, respectively. The electronic document manager 218 includes, but is not limited to, a complexity analyzer 220, a time estimator 222, an availability manager 224, a time allocation manager 226, an auto-delegator 228 and a data storage 230. Also as shown in FIG. 2, the electronic document application 204a, 204b installed on the client-computing devices 202a, 202b includes, but is not limited to, a display manager 206a, 206b, an input detector 208a, 208b, and a data storage 210a, 210b.

Although the disclosure herein shows the components 202a, 202b through 230 to be separate in FIG. 2, any of the components 202a, 202b through 230 may be combined into fewer components, such as into a single facility or module, or divided into more components as may serve one or more embodiments. In addition, the components 202a, 202b through 230 may be located on, or implemented by, one or more computing devices, such as those described below in relation to FIG. 5.

In at least one embodiment, the client-computing device 202a is associated with an owner of an electronic document (e.g., as with client-computing device 100a in FIGS. 1A and 1B), and the client-computing device 202b is associated with a recipient of an electronic document (e.g., as with client-computing device 100b in FIGS. 1C and 1D). In one or more embodiments, the electronic document application 204a, 204b is a native application installed on the client-computing devices 202a, 202b, respectively. For instance, the electronic document application 204a, 204b may be a mobile application that installs and runs on a client device with a touch screen, such as a smart phone or a tablet. Alternatively, the electronic document management system can run on a non-touch screen enabled device.

Thus, the client-computing device 202a, 202b can be any type of computing device (e.g., a desktop or laptop), but is preferably a handheld device such as a tablet, a smart phone, a personal digital assistant, a smart wearable (e.g., a smart watch or enhanced eyewear), etc. In additional or alternative embodiments, the electronic document application 204a, 204b is a desktop application, widget, or other form of a native computer program. Alternatively, the electronic document application 204a, 204b may be a remote application accessed by the client-computing device 202a, 202b over a network, or may be a web application that is executed with a web browser of the client-computing device 202a, 202b.

In one or more embodiments, the components 202a, 202b through 230 comprise software, hardware, or both. For example, the components 202a, 202b through 230 can comprise computing instructions stored on a non-transitory computer-readable storage medium and executable by at least one processor of the client-computing device 202a, 202b. When executed by the at least one processor, the computer-executable instructions cause the client-computing device 202a, 202b to perform the methods and processes described herein. Alternatively, the components 202a, 202b through 230 can comprise hardware, such as a special purpose processing device to perform a certain function or group of functions. Additionally or alternatively, the components 202a, 202b through 230 can comprise a combination of computer-executable instructions and hardware.

The electronic document management system 200 allows document owners and recipients to upload, review, and sign electronic documents using the electronic document application 204a, 204b accessible via the client-computing devices 202a, 202b. In general, by accessing the electronic document application 204a, 204b, a document owner or recipient can utilize the server 216 and the electronic document manager 218 thereon to manage electronic documents. Furthermore, in some embodiments, the electronic document application 204a, 204b can include various background services that assist in completing pending tasks (e.g., storage tasks, uploading tasks, downloading tasks, notification tasks, etc.).

As mentioned above, and as shown in FIG. 2, the electronic document application 204a, 204b includes a display manager 206a, 206b. The display manager 206a, 206b can provide, manage, or control a graphical user interface (or simply "user interface") that allows a user to upload, review, and etc. information from the electronic document manager 218. For example, the display manager 206a, 206b provides a user interface that facilitates interactions with a display. Likewise, the display manager 206a, 206b can provide a user interface that displays information received from the electronic document manager 218.

More specifically, the display manager 206a, 206b facilitates the display of a user interface (e.g., by way of a display device associated with the client-computing device 202a, 202b). For example, the user interface composes a plurality of graphical components, objects, or elements that allow a user to interact with the electronic document manager 218. More particularly, the display manager 206a, 206b directs the client-computing device 202a, 202b to display a group of graphical components, objects or elements as directed by the electronic document manager 218, as will be described further below.

As further illustrated in FIG. 2, the electronic document application 204a, 204b includes an input detector 208a, 208b. In one or more embodiments, the input detector 208a, 208b detects, receives, or facilitates user input in any suitable manner. In some examples, the input detector 208a, 208b detects one or more user interactions with respect to the user interface. As referred to herein, a "user interaction" means a single interaction, or combination of interactions, received from a user by way of one or more input devices.

For example, the input detector 208a, 208b detects a user interaction from a keyboard, mouse, touch pad, touch screen, or any other input device. In the event the client-computing device 202a, 202b includes a touch screen, the input detector 208a, 208b can detect one or more touch gestures (e.g., swipe gestures, tap gestures, pinch gestures, or reverse pinch gestures) that form a user interaction. In some examples, a user provides the touch gestures in relation to, or directed at, one or more graphical objects or graphical elements of a user interface.

The input detector 208a, 208b may additionally, or alternatively, receive data representative of a user interaction. For example, the input detector 208a, 208b may receive one or more user configurable parameters from a user, one or more user commands from the user, or any other suitable user input. The input detector 208a, 208b may receive input data from one or more components of the electronic document application 204a, 204b, from the storage on the client-computing device 202a, 202b, or from one or more remote locations (e.g., the electronic document manager 218).

The electronic document application 204a, 204b can perform one or more functions in response to the input detector 208a, 208b detecting user input or receiving other data. Generally, a user can control, navigate, and otherwise use the electronic document application 204a, 204b by providing one or more user inputs that the input detector 208a, 208b detects. For example, in response to the input detector 208a, 208b detecting user input, one or more components of the electronic document application 204a, 204b allow the user to view data, interact with various controls, or submit requests. In addition, in response to the input detector 208a, 208b detecting user input, one or more components of the electronic document application 204a, 204b allow a user to navigate through one or more user interfaces to configure, edit, send, sign, or receive an electronic document.

In one or more embodiments, in response to the input detector 208a, 208b detecting one or more user inputs, the electronic document application 204a, 204b facilitates the electronic document manager 218 in assisting the user in uploading, reviewing, and signing an electronic document. For example, a user may provide input (e.g., via a button click, a list item selection, a drag-and-drop, etc.) indicating an update or change to an electronic document. In response to the input detector 208a, 208b detecting the input, the electronic document manager 218 can take appropriate action in response to the detected user input.

Also, as mentioned above, and as illustrated in FIG. 2, the electronic document application 204a, 204b also includes a data storage 210a, 210b. The data storage 210a, 210b stores and maintains document data 212a, 212b representative of electronic document information such as, but not limited to, electronic document uploads, edits, electronic document content, electronic document owners and recipients, etc. The data storage 210a, 210b also stores and maintains user data 214a, 214b representative of electronic information such as, but not limited to, user calendars and schedules, tracked user information (e.g., time spent in review, etc.), and so forth. In one or more embodiments, a user of the electronic document application 204a, 204b can search, review, export, or share the information within the data storage 210a, 210b.

As discussed above, and as shown in FIG. 2, the server 216 includes the electronic document manager 218. The electronic document manager 218 handles, communications, receives, provides, stores, analyzes, displays, and otherwise manages electronic documents. Additionally, the electronic document manager 218 configures and provides a variety of displays or APIs that assist an electronic document management system user in sending, receiving, reviewing, and signing electronic documents. Further, the electronic document manager 218 configures and provides additional APIs or protocols that allow the electronic document manager 218 to access and update one or more third party calendaring applications associated with an electronic document management system user.

As mentioned above, and as illustrated in FIG. 2, the electronic document manager 218 includes a complexity analyzer 220. In one or more embodiments, the complexity analyzer 220 determines a complexity level associated with an uploaded electronic document (e.g., as described with reference to FIG. 1A). For example, the complexity analyzer 220 calculates a Flesch Reading Ease Score associated with an electronic document. As described above, the complexity analyzer 220 calculates the Flesch Reading Ease Score for an electronic document by identifying a total number of words in the electronic document, a total number of sentences in the electronic document, and a total number of syllables in the electronic document. The complexity analyzer 220 then applies the Flesch Reading Ease Score equation described above to calculate a score.

Additionally, the complexity analyzer 220 takes additional features of the electronic document into account when determining the overall complexity of the electronic document. For example, the complexity analyzer 220 takes into account one or more hyperlinks within the electronic document. Additionally, the complexity analyzer 220 takes into account one or more clauses within the electronic document. The complexity analyzer 220 generally assumes that hyperlinks and clauses within an electronic document will increase the amount of time needed to review the electronic document, as described above with reference to FIGS. 1A-1B. In one or more embodiments, the complexity analyzer 220 can store historic data and user test data over time and develop a learned model that changes over time. The complexity analyzer 220 then sorts the electronic document into a complexity category or "bucket" based on the result of the overall complexity equation (see Table 1 above).

As mentioned above, and as illustrated in FIG. 2, the electronic document manager 218 also includes a time estimator 222. In one or more embodiments, the time estimator 222 determines how long a document falling into any of the complexity categories should take a recipient to review. For example, in one embodiment, the time estimator 222 collects and analyzes user data over time from all users of the electronic document management system to determine an average amount of review time needed for an electronic document in each of the categories utilized by the complexity analyzer 220. For instance, in at least one embodiment, the time estimator 222 can utilize crowd-sourced information to determine how long a group of users took to review documents within a given category. From this information the time estimator 222 can estimate how long a specific user will likely take to review a new document that has been classified within the given category. In some embodiments, the electronic document manager 218 can assign unique identifiers to categorized documents to assist in tracking crowd-sourcing information.

Alternatively, the time estimator 222 can collect and analyze user data for a particular user in order to determine how long the particular user should take to review a particular document. For example, during a learning period, the time estimator 222 can utilize eye tracking, scroll tracking, mouse or keyboard events, and so forth to determine how long a particular user takes to review an electronic document of a given complexity level. The time estimator 222 can then store that information in a repository associated with the particular user. Thus, over time, the particular user's repository includes information from which the time estimator 222 can identify an average amount of time that the particular user should take to review a new electronic document of a given complexity level.

As discussed above, and as illustrated in FIG. 2, the electronic document manager 218 also includes an availability manager 224. In one or more embodiments, in response to a document owner uploading an electronic document, specifying a signing deadline for the electronic document, and selecting a potential recipient, the availability manager 224 performs an analysis to determine whether the potential recipient is likely available to review and sign the electronic document prior to the document's signing deadline. In at least one embodiment, the availability manager 224 begins the analysis by accessing information specific to the potential recipient within the electronic document management system. For example, the availability manager 224 accesses information including the amount, complexity levels, and deadlines of electronic documents currently assigned to the potential recipient. The availability manager 224 also accesses the potential recipient's repository of observed review data to determine how long the potential recipient will likely take to review the uploaded electronic document. From this information, the availability manager 224 will determine if the potential recipient likely has enough time to review and sign the uploaded electronic document prior to its signing deadline, in light of the potential recipient's existing workload.

Additionally, the availability manager 224 can access user preferences defined by the potential recipient and additional third-party calendar information to further refine the determination as to whether the potential recipient is likely available to review and sign the uploaded electronic document prior to the document's deadline. For example, the potential recipient may have specified that he is only available to perform document review for 4 hours a day through the workweek. The availability manager 224 can take this preference into account when determining whether the potential recipient has enough time to review the uploaded electronic document. Additionally, the potential recipient may have additional meetings and obligations stored on a third-party calendar (e.g., an OUTLOOK™ calendar, a GOOGLE™ calendar, etc.). Accordingly, the availability manager 224 can utilize various APIs or other protocols to access this calendar information in determining whether the potential recipient has enough time to review the uploaded electronic document.

As mentioned above, and as shown in FIG. 2, the electronic document manager 218 includes a time allocation manager 226. In one or more embodiments, the time allocation manager 226 schedules the review and signing of one or more electronic documents assigned to a recipient such that the review and signing of each electronic document is accomplished prior to the document's deadline. In at least one embodiment, as described above, the time allocation manager 226 schedules review and signing of electronic documents based on the document's deadlines as well as on various preferences defined by the recipient.

Furthermore, in at least one embodiment, the time allocation manager 226 generates a visual display of the recipient's review schedule. For example, the time allocation manager 226 can generate the display to represent the standard calendar view 138, as shown in FIG. 1C, wherein review time is blocked out within the recipient's calendar. In other embodiments, the time allocation manager 226 can generate a display that shows how much review the recipient has completed with regard to various electronic documents, and how much review the recipient has remaining with regard to the same electronic documents prior to the documents' deadlines. In yet other embodiments, the time allocation manager 226 can simply generate a "To Do" list that is ranked based on electronic document priority based on signing deadlines.

Additionally, the time allocation manager 226 dynamically updates the review schedule of a recipient based on changing data. For example, if the recipient is falling behind in the review of a particular electronic document (e.g., as indicated by monitored eye tracking, scroll tracking, etc.), the time allocation manager 226 can update the recipient's review schedule to allow more review time in order to catch up. The time allocation manager 226 can further update the recipient's review schedule with regard to other electronic documents awaiting recipient review, as described above. When the recipient completes review and signing of an electronic document, the time allocation manager 226 removes the electronic document from the recipient's review schedule.

In response to determining that a recipient is either falling behind in review of a particular electronic document or will likely not complete review and signing of a particular electronic document prior to the document's deadline, the time allocation manager 226 also generates one or more notifications. For example, in one embodiment, the time allocation manager 226 generates a recipient notification that includes information detailing the how much time the recipient likely needs to spend in order to complete review and signing of an electronic document. In another embodiment, in response to determining that a recipient has fallen too far behind, the time allocation manager 226 generates a document owner notification the includes information detailing how the recipient will likely not complete review of the electronic document and providing additional options to the electronic document owner.

As illustrated in FIG. 2, and as mentioned above, the electronic document manager 218 includes an auto-delegator 228. In one or more embodiments, the auto-delegator 228 accesses organizational information associated with a business or organization in order to identify alternative recipients of an electronic document. As described above, when the availability manager 224 determines that a potential recipient is likely unavailable to review and sign an electronic document prior to the document's deadline, the auto-delegator 228 can suggest one or more alternative potential recipients to the document owner. In at least one embodiment, the auto-delegator 228 identifies alternative potential recipients by accessing account information to identify organizational information indicating other employees of a business or organization who are employed at the same or higher level as the likely unavailable potential recipient. The auto-delegator 228 can suggest any of these identified users. Alternatively, the document owner may specify various delegation rules that instruct the auto-delegator 228 on which alternate recipients to suggest in certain circumstances.

Additionally, after an electronic document has been provided to a recipient and in response to a determination that the recipient is likely not going to complete review and signing of the electronic document prior to the document's deadline, the auto-delegator 228 can identify one or more alternate recipients to suggest to the document owner. For example, as described above, the auto-delegator 228 accesses organization information to identify suitable and available alternate recipients for a particular electronic document. Alternatively, the auto-delegator 228 may simply provide the electronic document to one or more recipients as specified by various auto-delegation rules provided by the document owner.

Also as mentioned above, and as illustrated in FIG. 2, the electronic document manager 218 includes a data storage 230. The data storage 230 stores and maintains user data 232 and document data 234. In one or more embodiments, user data 232 is representative of user information, such as described herein. Also, in one or more embodiments, document data 234 is representative of electronic document information, such as described herein.

Figure 3:
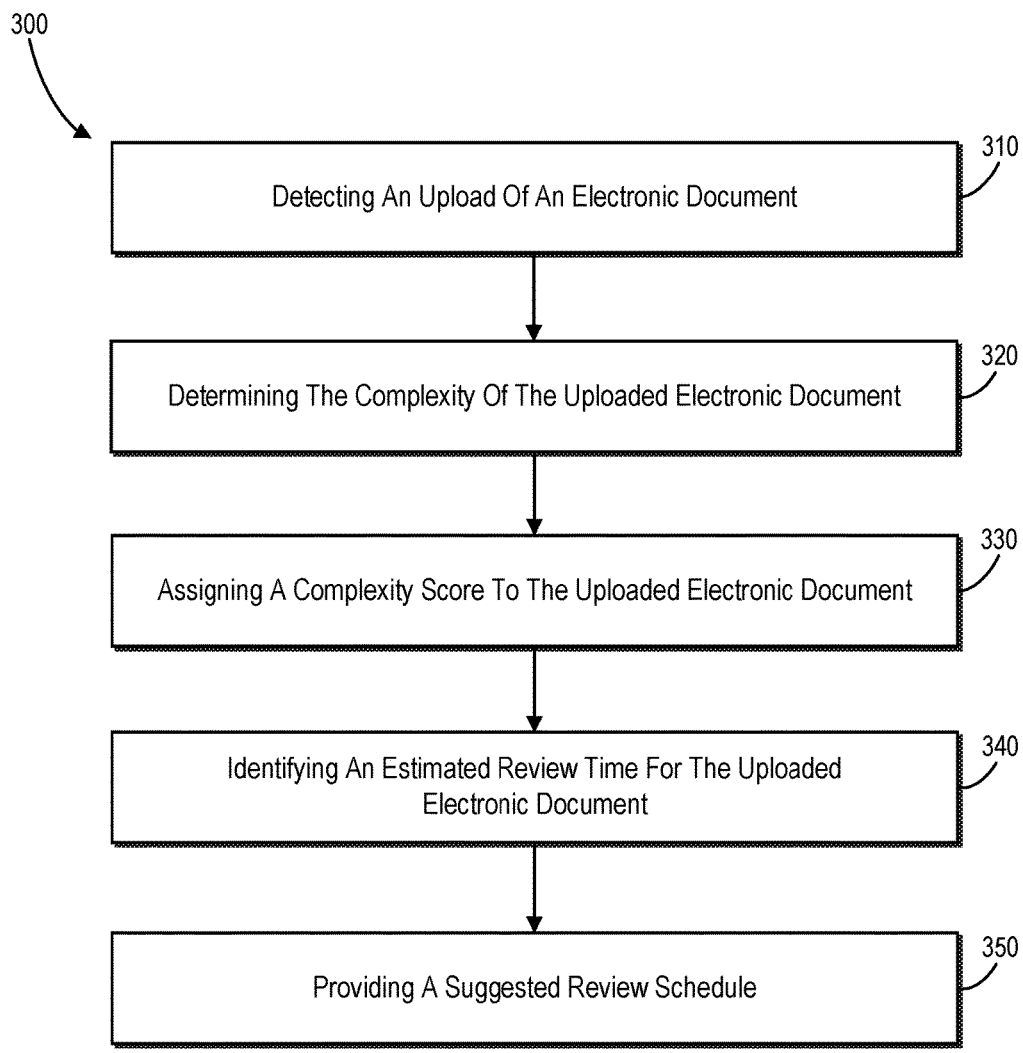
FIG. 3 illustrates a flowchart of a series of acts in a method of managing one or more electronic documents in accordance with one or more embodiments.

FIGS. 1A-2, the corresponding text, and the examples provide a number of different methods, systems, and devices for determining the complexity of an electronic document and scheduling the review and signing of the electronic document with one or more recipients. In addition to the foregoing, embodiments can also be described in terms of flowcharts comprising acts and steps in a method for accomplishing a particular result. For example, FIG. 3 illustrates a flowchart illustrating acts and steps in a method of facilitating electronic signing of electronic documents. One will appreciate in light of the disclosure herein that the method may be performed with less or more steps or acts or the steps or acts may be performed in differing orders. Additionally, the steps or acts described herein may be repeated or performed in parallel with one another or in parallel with different instances of the same or similar steps or acts.

FIG. 3 illustrates a flowchart of one example method 300 of facilitating electronic signing of electronic documents. The method 300 includes an act 310 of detecting an upload of an electronic document. In particular, the act 310 involves detecting an upload of an electronic document for a recipient to review and sign (e.g., via the upload GUI 104 as shown in FIG. 1A).

Furthermore, the method 300 includes an act 320 of determining the complexity of the uploaded electronic document. In particular, the act 320 involves determining the complexity of the uploaded electronic document, wherein determining the complexity of the uploaded electronic document comprises analyzing the uploaded document's readability, identifying one or more hyperlinks in the uploaded electronic document, and determining a number of clauses within the uploaded electronic document. For example, in one or more embodiments, analyzing the uploaded electronic document's readability comprises calculating a readability score based on the total words in the uploaded electronic document, the total sentences in the uploaded electronic document, and the total syllables in the uploaded electronic document.

The method 300 also includes an act 330 of assigning a complexity score to the uploaded electronic document. In particular, the act 330 involves assigning a complexity score to the uploaded electronic document based on the analyzed complexity of the uploaded electronic document. In at least one embodiment, the method 300 further includes an act of calculating a complexity score, wherein the complexity score is based on the readability score for the uploaded electronic document, a number of hyperlinks associated with the uploaded electronic document, and a number of clauses associated with the uploaded electronic document.

Additionally, the method 300 includes an act 340 of identifying an estimated review time for the uploaded electronic document. In particular, the act 340 involves identifying an estimated review time for the uploaded electronic document based on the assigned complexity score. For example, in at least one embodiment, identifying an estimated review time for the uploaded electronic document includes assigning a category to the uploaded electronic document based on the calculated complexity score, and identifying an average amount of time for review of all electronic documents assigned to the category.

The method 300 also includes an act 350 of providing a suggested review schedule. In particular, the act 350 involves, based on the estimated review time, providing a suggested review schedule of the uploaded electronic document (e.g., as illustrated by the calendar view 138 in FIG. 1C). In one or more embodiments, providing a suggested review schedule of the electronic document includes identifying one or more recipients of the uploaded electronic document, accessing a schedule for each of the one or more recipients, determining an amount of available time for each of the one or more recipients, and determining that the amount of available time for each of the one or more recipients is sufficient to review and sign the uploaded electronic document. In at least one embodiment, determining an amount of available time for each of the one or more recipients includes identifying an amount of unscheduled time in the calendar of each of the one or more recipients, identifying additional preferences associated with each of the one or more recipients, and for each of the one or more recipients, calculating the amount of available time in light of the amount of unscheduled time and the additional preferences. For example, determining that the amount of available time for each of the one or more recipients is sufficient to review and sign the uploaded electronic document comprises comparing the calculated amount of available time for each of the one or more recipients to the estimated review time for the uploaded electronic document.

Figure 4:
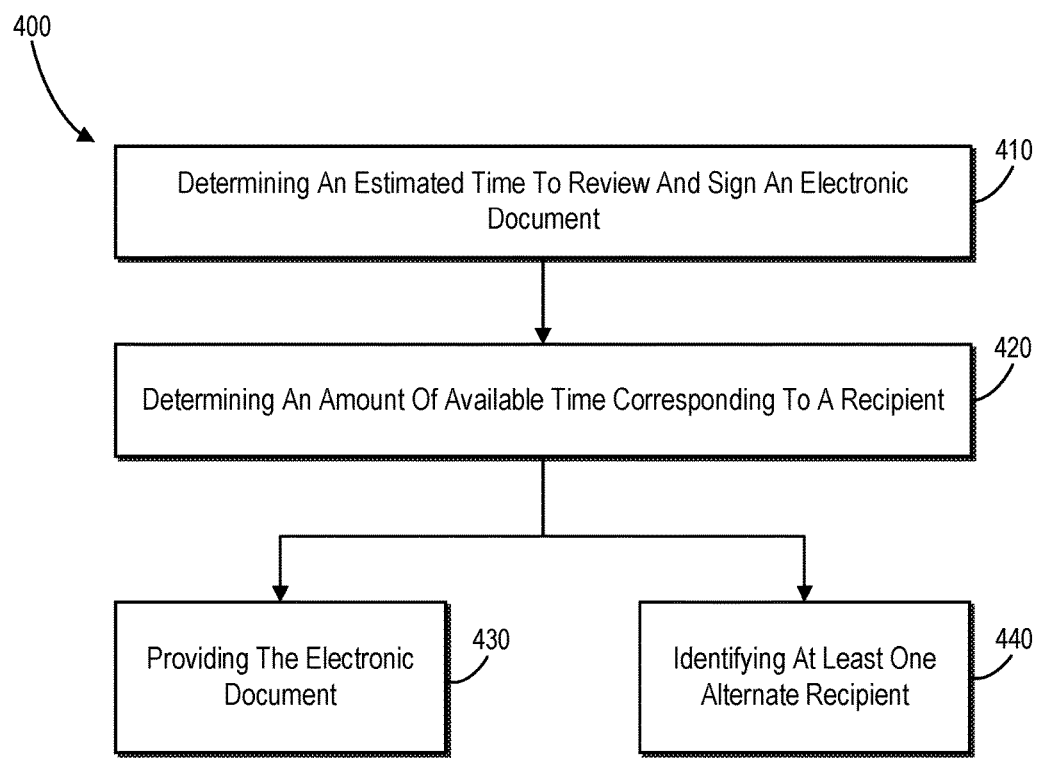
FIG. 4 illustrates a flowchart of a series of acts in another method of managing one or more electronic documents in accordance with one or more embodiments.

FIG. 4 illustrates a flowchart of another example method 400 of facilitates electronic signing of electronic documents. The method 400 includes an act 410 of determining an estimated time to review and sign an electronic document. In particular, the act 410 involves determining an estimated time to review and sign an electronic document, wherein the estimated time is based on a complexity of the electronic document. For example, determining an estimated time to review and sign the electronic document comprises calculating a complexity score for the electronic document, wherein the complexity score is based on an analysis of the electronic document's readability, one or more hyperlinks identified in the electronic document, and a number of clauses determined within the electronic document.

Furthermore, the method 400 includes an act 420 of determining an amount of available time corresponding to a recipient. In particular, the act 420 involves determining an amount of available time corresponding to a recipient, wherein the amount of available time is within a time period starting at a current time and ending at a deadline associated with the electronic document. For example, in at least one embodiment, determining an amount of available time corresponding to the recipient includes accessing a calendar of the recipient and identifying within the calendar unscheduled time during the time period.

The method 400 also includes an act of determining whether the amount of available time is sufficient to review and sign the electronic document, wherein determining whether the amount of available time is sufficient comprises comparing the estimated time to review and sign the electronic document to the amount of available time corresponding to the recipient. The method 400 further includes an act 430 of providing the electronic document. In particular, the act 430 involves, based on a determination that the amount of available time is sufficient to review and sign the electronic document prior to the deadline associated with the electronic document, providing the electronic document to the recipient. In one or more embodiments, providing the electronic document to the recipient includes adding the electronic document to an existing repository of electronic documents that have been assigned to the recipient, and scheduling the review and signature of the electronic document for the recipient. For example, scheduling the review and signature of the electronic document for the recipient includes accessing a schedule of the recipient, identifying available time within the schedule of the recipient, wherein the available time is equal to the estimated time to review and sign the electronic document, and scheduling the review and signature of the electronic document in the available time.

In at least one embodiment, the method 400 also includes, after the recipient has been provided the electronic document, determining that the recipient has not accessed the electronic document, and determining that the amount of time remaining before the deadline associated with the electronic document is equal to or less than the estimated time to review and sign the electronic document. In at least one embodiment, the method 400 further includes one or more of notifying the recipient that review of the electronic document needs to start soon to avoid missing the deadline, and notifying the owner of the electronic document that an alternate recipient should be considered.

The method 400 also includes an act 440 of identifying at least one alternate recipient. In particular, the act 440 involves based on a determination that the amount of available time is insufficient to review and sign the electronic document prior to the deadline associated with the electronic document, identifying at least one alternate recipient to review and sign the electronic document. In one or more embodiments, identifying at last one alternate recipient to review and sign the electronic document includes accessing organizational information to identify the at least one alternate recipient.

In one or more embodiments, the method 400 includes acts of receiving a selection of one or more additional recipients, determining an amount of available time corresponding to each of the one or more additional recipients, for each of the one or more additional recipients: based on a determination that the amount of available time is sufficient to review and sign the electronic document prior to the deadline associated with the electronic document, providing the electronic document to the additional recipient, and based on a determination that the amount of available time is insufficient to review and sign the electronic document prior to the deadline associated with the electronic document, notifying an owner of the electronic document that the additional recipient is likely unavailable to review and sign the electronic document. Additionally, the method 400 can include an act of, in response to the determination that the amount of available time is insufficient to review and sign the electronic document, identifying an alternate additional recipient and notifying the owner of the electronic document of the alternate additional recipient.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems or modules or other electronic devices. When information is transferred or provided over a network or another communications connection (either hardwired, wireless, or a combination of hardwired or wireless) to a computer, the computer properly views the connection as a transmission medium. Transmissions media can include a network or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 5:
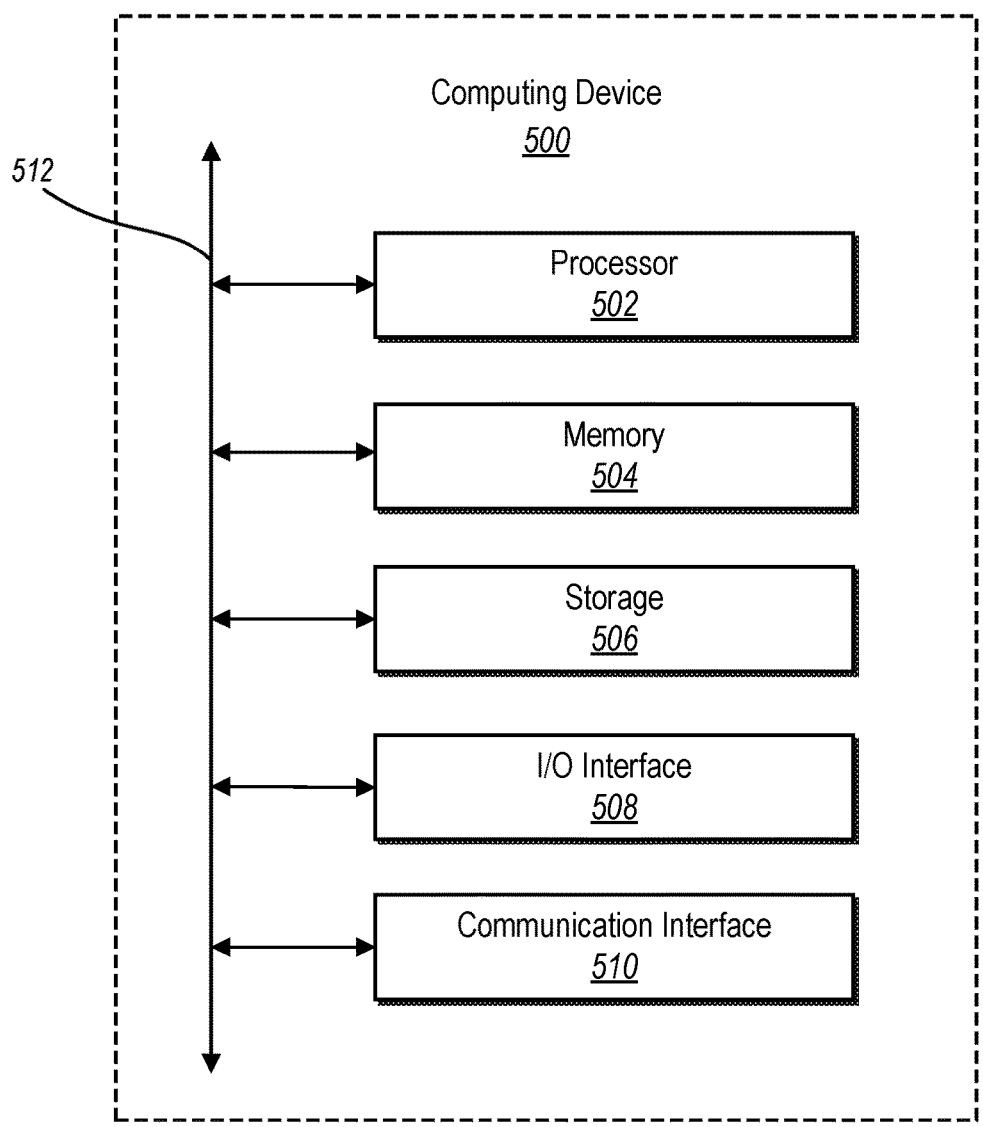
FIG. 5 illustrates a block diagram of an exemplary computing device in accordance with one or more embodiments.

FIG. 5 illustrates a block diagram of an exemplary computing device 500 that may be configured to perform one or more of the processes described above. One will appreciate that one or more computing devices such as the computing device 500 may implement the electronic document management system. As shown by FIG. 5, the computing device 500 can comprise a processor 502, memory 504, a storage device 506, an I/O interface 508, and a communication interface 510, which may be communicatively coupled by way of a communication infrastructure 512. While an exemplary computing device 500 is shown in FIG. 5, the components illustrated in FIG. 5 are not intended to be limiting. Additional or alternative components may be used in other embodiments. Furthermore, in certain embodiments, the computing device 500 can include fewer components than those shown in FIG. 5. Components of the computing device 500 shown in FIG. 5 will now be described in additional detail.

In particular embodiments, the processor 502 includes hardware for executing instructions, such as those making up a computer program. As an example and not by way of limitation, to execute instructions, the processor 502 may retrieve (or fetch) the instructions from an internal register, an internal cache, the memory 504, or the storage device 506 and decode and execute them. In particular embodiments, the processor 502 may include one or more internal caches for data, instructions, or addresses. As an example and not by way of limitation, the processor 502 may include one or more instruction caches, one or more data caches, and one or more translation lookaside buffers (TLBs). Instructions in the instruction caches may be copies of instructions in the memory 504 or the storage 506.

The memory 504 may be used for storing data, metadata, and programs for execution by the processor(s). The memory 504 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 504 may be internal or distributed memory.

The storage device 506 includes storage for storing data or instructions. As an example and not by way of limitation, the storage device 506 can comprise a non-transitory storage medium described above. The storage device 506 may include a hard disk drive (HDD), a floppy disk drive, flash memory, an optical disc, a magneto-optical disc, magnetic tape, or a Universal Serial Bus (USB) drive or a combination of two or more of these. The storage device 506 may include removable or non-removable (or fixed) media, where appropriate. The storage device 506 may be internal or external to the computing device 500. In particular embodiments, the storage device 506 is non-volatile, solid-state memory. In other embodiments, the storage device 506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 508 allows a user to provide input to, receive output from, and otherwise transfer data to and receive data from the computing device 500. The I/O interface 508 may include a mouse, a keypad or a keyboard, a touch screen, a camera, an optical scanner, network interface, modem, other known I/O devices or a combination of such I/O interfaces. The I/O interface 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. The graphical data may be representative of one or more graphical user interfaces or any other graphical content as may serve a particular implementation.

The communication interface 510 can include hardware, software, or both. In any event, the communication interface 510 can provide one or more interfaces for communication (such as, for example, packet-based communication) between the computing device 500 and one or more other computing devices or networks. As an example and not by way of limitation, the communication interface 510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 510 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 512 may include hardware, software, or both that couples components of the computing device 500 to each other. As an example and not by way of limitation, the communication infrastructure 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 6:
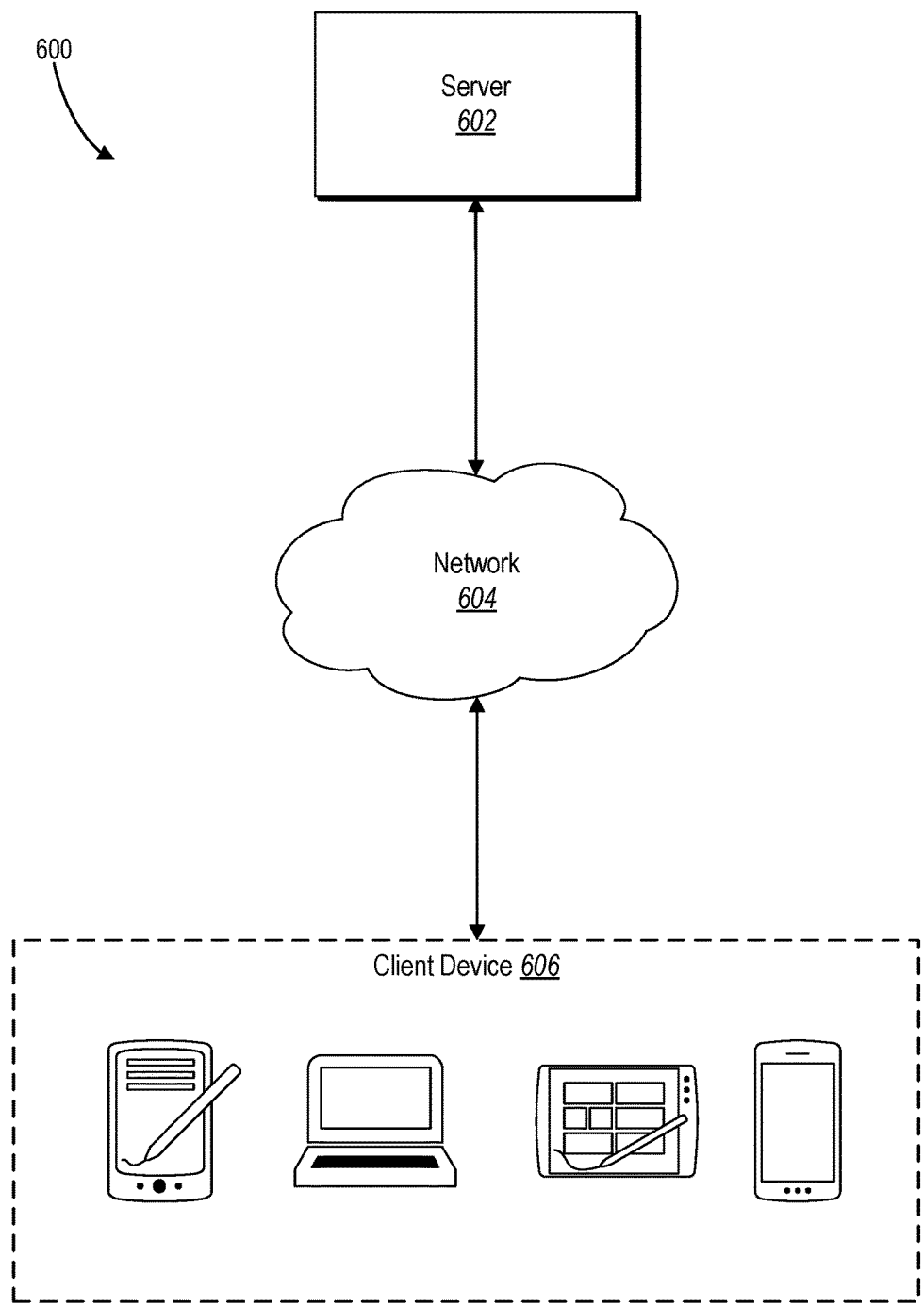
FIG. 6 is an example network environment in which the electronic document management system can operate in accordance with one or more embodiments.

FIG. 6 illustrates an example network environment 600 of in which the electronic document management system can operate. The network environment 600 includes a client system 606, and a server 602 connected to each other by a network 604. Although FIG. 6 illustrates a particular arrangement of the client system 606, the server 602, and the network 604, this disclosure contemplates any suitable arrangement of the client system 606, the server 602, and the network 604. As an example and not by way of limitation, the client system 606 and the server 602 may be connected to each other directly, bypassing network 604. As another example, the client system 606 and the server 602 may be physically or logically co-located with each other in whole or in part. Moreover, although FIG. 6 illustrates a particular number of client systems 606, servers 602, and networks 604, this disclosure contemplates any suitable number of client systems 606, servers 602, and networks 604. As an example and not by way of limitation, network environment 600 may include multiple client system 606, servers 602, and networks 604.

This disclosure contemplates any suitable network 604. As an example and not by way of limitation, one or more portions of network 604 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 604 may include one or more networks 604.

Links may connect client system 606 and the server 602 to the communication network 604 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 600. One or more first links may differ in one or more respects from one or more second links.

In particular embodiments, client system 606 may be an electronic device including hardware, software, or embedded logic components or a combination of two or more such components and capable of carrying out the appropriate functionalities implemented or supported by client system 606. As an example and not by way of limitation, a client system 606 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 606. A client system 606 may enable a network user at client system 606 to access network 604. A client system 606 may enable its user to communicate with other users at other client systems 606.

In particular embodiments, client system 606 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 606 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client system 606 one or more Hyper Text Markup Language (HTML) files responsive to the HTTP request. Client system 606 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server 602 may be capable of linking a variety of entities. As an example and not by way of limitation, server 602 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating the server 602. In particular embodiments, however, the server 602 and third-party systems may operate in conjunction with each other to provide analytics services to users of the server 602 or third-party systems. In this sense, server 602 may provide a platform, or backbone, which other systems, such as third-party systems, may use to provide analytic or data or tracking services and functionality to users across the Internet.

In particular embodiments, a third-party system may include a third-party content object provider. A third-party content object provider may include one or more sources of content objects, which may be communicated to a client system 606. As an example and not by way of limitation, content objects may include information regarding things or activities of interest to the user, such as, for example, digital media, digital designs, digital photographs, digital videos, digital audio, clip art, fonts, etc. As another example and not by way of limitation, content objects may include metadata that describes the content objects.

In particular embodiments, server 602 may include a variety of servers, sub-systems, programs, modules, logs, and data stores. In particular embodiments, server 602 may include one or more of the following: a web server, action logger, API-request server, relevance-and-ranking engine, content-object classifier, notification controller, action log, third-party-content-object-exposure log, inference module, authorization or privacy server, search module, advertisement-targeting module, user-interface module, user-profile store, connection store, third-party content store, or location store. Server 602 may also include suitable components such as network interfaces, security mechanisms, load balancers, failover servers, management-and-network-operations consoles, other suitable components, or any suitable combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps or acts or the steps or acts may be performed in differing orders. Additionally, the steps or acts described herein may be repeated or performed in parallel with one another or in parallel with different instances of the same or similar steps or acts. The scope of the present application is, therefore, indicated by the appended claims rather than by the foregoing description. All changes that come within the meaning and range of equivalency of the claims are to be embraced within their scope.

What is claimed is:

1. In a digital medium environment that facilitates electronic signing of electronic documents, a method for scheduling review of an electronic document, comprising:
   detecting an upload of an electronic document for a recipient to review and sign;
   determining the complexity of the uploaded electronic document, wherein determining the complexity of the uploaded electronic document comprises analyzing the uploaded document's readability, identifying one or more hyperlinks in the uploaded electronic document, and determining a number of clauses within the uploaded electronic document;
   assigning a complexity score to the uploaded electronic document based on the analyzed complexity of the uploaded electronic document;
   identifying an estimated review time for the uploaded electronic document based on the assigned complexity score by:
      assigning, based on the complexity score, the uploaded electronic document to a pre-existing complexity category comprising previously analyzed electronic documents, and
      identifying an average amount of time taken to review the previously analyzed electronic documents in the pre-existing complexity category;
   based on the estimated review time, providing a suggested review schedule of the uploaded electronic document by:
      identifying one or more recipients of the uploaded electronic document,
      accessing a schedule for each of the one or more recipients,
      determining an amount of available time for each of the one or more recipients, and
      determining that the amount of available time for each of the one or more recipients is sufficient to review and sign the uploaded electronic document; and wherein the uploaded electronic document's readability is based at least on a total number of words in the uploaded electronic document.

2. The method as recited in claim 1, wherein analyzing the uploaded electronic document's readability comprises calculating a readability score based on the total number of words in the uploaded electronic document, a total number of sentences in the uploaded electronic document, and a total number of syllables in the uploaded electronic document.

3. The method as recited in claim 2, further comprising calculating the complexity score, wherein the complexity score is based on the readability score for the uploaded electronic document, a number of hyperlinks associated with the uploaded electronic document, and a number of clauses associated with the uploaded electronic document.

4. The method as recited in claim 3, wherein determining an amount of available time for each of the one or more recipients comprises:
   identifying an amount of unscheduled time in a calendar of each of the one or more recipients;
   identifying additional preferences associated with each of the one or more recipients; and
   for each of the one or more recipients, calculating the amount of available time in light of the amount of unscheduled time and the additional preferences.

5. The method as recited in claim 4, wherein determining that the amount of available time for each of the one or more recipients is sufficient to review and sign the uploaded electronic document comprises comparing the calculated amount of available time for each of the one or more recipients to the estimated review time for the uploaded electronic document.

6. A system comprising:
   at least one processor; and
   at least one non-transitory computer-readable storage medium storing instructions thereon that, when executed by the at least one processor, cause the system to:
   detect an upload of an electronic document for a recipient to review and sign;
   determine the complexity of the uploaded electronic document, wherein determining the complexity of the uploaded electronic document comprises analyzing the uploaded electronic document's readability, identifying one or more hyperlinks in the uploaded electronic document, and determining a number of clauses within the uploaded electronic document;
   assign a complexity score to the uploaded electronic document based on the analyzed complexity of the uploaded electronic document;
   identify an estimated review time for the uploaded electronic document based on the assigned complexity score by:
      assigning, based on the complexity score, the uploaded electronic document to a pre-existing complexity category comprising previously analyzed electronic documents, and
      identifying an average amount of time taken to review the previously analyzed electronic documents in the pre-existing complexity category;
   based on the estimated review time, providing a suggested review schedule of the uploaded electronic document by:
      identifying one or more recipients of the uploaded electronic document,
      accessing a schedule for each of the one or more recipients,
      determining an amount of available time for each of the one or more recipients, and
      determining that the amount of available time for each of the one or more recipients is sufficient to review and sign the uploaded electronic document; and
   wherein the uploaded electronic document's readability is based at least on a total number of words in the uploaded electronic document.

7. The system as recited in claim 6, wherein analyzing the uploaded electronic document's readability comprises calculating a readability score based on the total number of words in the uploaded electronic document, a total number of sentences in the uploaded electronic document, and a total number of syllables in the uploaded electronic document.

8. The system as recited in claim 7, further storing instructions thereon that, when executed by the at least one processor, cause the system to calculate the complexity score, wherein the complexity score is based on the readability score for the uploaded electronic document, a number of hyperlinks associated with the uploaded electronic document, and a number of clauses associated with the uploaded electronic document.

9. The system as recited in claim 8, wherein determining an amount of available time for each of the one or more recipients comprises:
   identifying an amount of unscheduled time in a calendar of each of the one or more recipients;
   identifying additional preferences associated with each of the one or more recipients; and
   for each of the one or more recipients, calculating the amount of available time in light of the amount of unscheduled time and the additional preferences.

10. The system as recited in claim 9, wherein determining that the amount of available time for each of the one or more recipients is sufficient to review and sign the uploaded electronic document comprises comparing the calculated amount of available time for each of the one or more recipients to the estimated review time for the uploaded electronic document.

11. A non-transitory computer-readable medium storing instructions thereon that, when executed by at least one processor, cause a computing device to:
   detect an upload of an electronic document for a recipient to review and sign;
   determine the complexity of the uploaded electronic document, wherein determining the complexity of the uploaded electronic document comprises analyzing the uploaded electronic document's readability, identifying one or more hyperlinks in the uploaded electronic document, and determining a number of clauses within the uploaded electronic document;
   assign a complexity score to the uploaded electronic document based on the analyzed complexity of the uploaded electronic document;
   identify an estimated review time for the uploaded electronic document based on the assigned complexity score by:
      assigning, based on the complexity score, the uploaded electronic document to a pre-existing complexity category comprising previously analyzed electronic documents, and
      identifying an average amount of time taken to review the previously analyzed electronic documents in the pre-existing complexity category;
   based on the estimated review time, providing a suggested review schedule of the uploaded electronic document by:

identifying one or more recipients of the uploaded electronic document, accessing a schedule for each of the one or more recipients, determining an amount of available time for each of the one or more recipients, and determining that the amount of available time for each of the one or more recipients is sufficient to review and sign the uploaded electronic document; and wherein the uploaded electronic document's readability is based at least on a total number of words in the uploaded electronic document.

12. The non-transitory computer-readable medium as recited in claim 11, wherein analyzing the uploaded electronic document's readability comprises calculating a readability score based on the total number of words in the uploaded electronic document, a total number of sentences in the uploaded electronic document, and a total number of syllables in the uploaded electronic document.

13. The non-transitory computer-readable medium as recited in claim 12, further storing instructions thereon that, when executed by at least one processor, cause the computing device to calculate the complexity score, wherein the complexity score is based on the readability score for the uploaded electronic document, a number of hyperlinks associated with the uploaded electronic document, and a number of clauses associated with the uploaded electronic document.

14. The non-transitory computer-readable medium as recited in claim 13, wherein determining an amount of available time for each of the one or more recipients comprises:

identifying an amount of unscheduled time in a calendar of each of the one or more recipients;

identifying additional preferences associated with each of the one or more recipients; and for each of the one or more recipients, calculating the amount of available time in light of the amount of unscheduled time and the additional preferences.

15. The non-transitory computer-readable medium as recited in claim 14, wherein determining that the amount of available time for each of the one or more recipients is sufficient to review and sign the uploaded electronic document comprises comparing the calculated amount of available time for each of the one or more recipients to the estimated review time for the uploaded electronic document.

16. The non-transitory computer-readable medium as recited in claim 15, wherein identifying an average amount of time taken to review the previously analyzed electronic documents in the pre-existing complexity category comprises:

accessing stored data associated with each previously analyzed electronic document to identify an amount of time that the previously analyzed electronic document was actively read; and averaging the active reading times for each the previously analyzed electronic documents in the pre-existing complexity category.

17. The non-transitory computer-readable medium as recited in claim 16, wherein identifying the amount of time that the previously analyzed electronic document was actively read comprises utilizing eye tracking data, scroll tracking data, mouse tracking data, and keyboard tracking data associated with the previously analyzed electronic document to identify an amount of time that the previously analyzed electronic document was actively read.

18. The method as recited in claim 5, wherein identifying an average amount of time taken to review the previously analyzed electronic documents in the pre-existing complexity category comprises:

accessing stored data associated with each previously analyzed electronic document to identify an amount of time that the previously analyzed electronic document was actively read; and averaging the active reading times for each the previously analyzed electronic documents in the pre-existing complexity category.

19. The method as recited in claim 18, wherein identifying the amount of time that the previously analyzed electronic document was actively read comprises utilizing eye tracking data, scroll tracking data, mouse tracking data, and keyboard tracking data associated with the previously analyzed electronic document to identify an amount of time that the previously analyzed electronic document was actively read.

20. The system as recited in claim 10, wherein:

identifying an average amount of time taken to review the previously analyzed electronic documents in the pre-existing complexity category comprises:

accessing stored data associated with each previously analyzed electronic document to identify an amount of time that the previously analyzed electronic document was actively read, and averaging the active reading times for each the previously analyzed electronic documents in the pre-existing complexity category; and identifying the amount of time that the previously analyzed electronic document was actively read comprises utilizing eye tracking data, scroll tracking data, mouse tracking data, and keyboard tracking data associated with the previously analyzed electronic document to identify an amount of time that the previously analyzed electronic document was actively read.

* * * * *